United States Patent [19]

Möckli

[11] Patent Number: 4,754,021
[45] Date of Patent: Jun. 28, 1988

[54] METHINE-AZO COMPOUNDS CONTAINING CYCLIC AMMONIUM GROUPS

[75] Inventor: Peter Möckli, Schönenbuch, Switzerland

[73] Assignee: Ciba-Geigy Corporation, Ardsley, N.Y.

[21] Appl. No.: 767,912

[22] Filed: Aug. 21, 1985

[30] Foreign Application Priority Data

Aug. 22, 1984 [CH] Switzerland ............... 4018/84

[51] Int. Cl.⁴ .................. C09B 44/02; C09B 44/08; D21H 3/80
[52] U.S. Cl. ........................ 534/605; 534/604; 534/606; 534/589; 544/197; 544/198; 544/208; 544/209; 546/329; 549/49
[58] Field of Search ............... 534/604, 605, 606

[56] References Cited

U.S. PATENT DOCUMENTS

| | | | |
|---|---|---|---|
| 3,185,538 | 5/1965 | Voltz et al. | 534/605 X |
| 3,331,381 | 7/1967 | Raue et al. | 534/606 X |
| 3,338,660 | 8/1967 | Biedermann | 534/603 X |
| 3,933,786 | 1/1976 | Peter et al. | 534/606 |
| 3,956,264 | 5/1976 | Raue et al. | 534/606 |
| 4,557,732 | 12/1985 | Hahnke et al. | 534/605 X |

FOREIGN PATENT DOCUMENTS

| | | | |
|---|---|---|---|
| 2620790 | 11/1976 | Fed. Rep. of Germany | 534/605 |
| 875995 | 8/1961 | United Kingdom | 534/605 |
| 896681 | 5/1962 | United Kingdom | 534/605 |
| 916697 | 1/1963 | United Kingdom | 534/605 |
| 944303 | 2/1963 | United Kingdom | 534/605 |
| 1214394 | 12/1970 | United Kingdom | 534/606 |
| 1221821 | 2/1971 | United Kingdom | 534/605 |

OTHER PUBLICATIONS

Voltz et al., Chemica 1 Abstracts, vol. 61, 12136 to 12137 (1964).

Primary Examiner—Floyd D. Higel
Attorney, Agent, or Firm—Wenderoth, Lind & Ponack

[57] ABSTRACT

Methine-azo compounds of the formulae

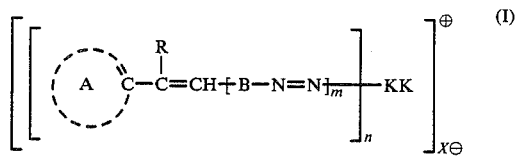

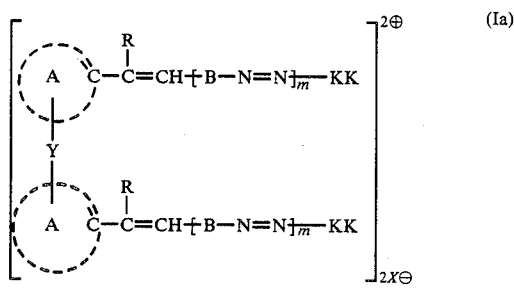

in which

A is the complement to a heterocyclic 5- or 6-membered ring which has a quaternized N atom as a ring member, which can contain further hetero atoms and which can be substituted and/or be fused with carbocyclic or heterocyclic rings, R is hydrogen, cyano or $C_2$-$C_3$-alkylene which is bonded to an N atom of ring A to form a 5- or 6-membered ring, B is substituted or unsubstituted phenylene or naphthylene, m and n independently of each other are the numbers 1 or 2, in the formula (I) at least one of the two symbols m and n being the number 2 and where in the case m=2 the two B's are identical or different, KK is the radical of a coupling component $X^\ominus$ is an anion and Y is a bridge member. These compounds can be used for dyeing and printing in particular polyacrylonitrile, acid-modified polyester and especially paper.

13 Claims, No Drawings

METHINE-AZO COMPOUNDS CONTAINING CYCLIC AMMONIUM GROUPS

The invention relates to novel methine-azo compounds, to processes for their preparation, and to their use as dyes for dyeing and printing cationically dyeable substrates, especially paper.

The novel compounds according to the invention have the formulae

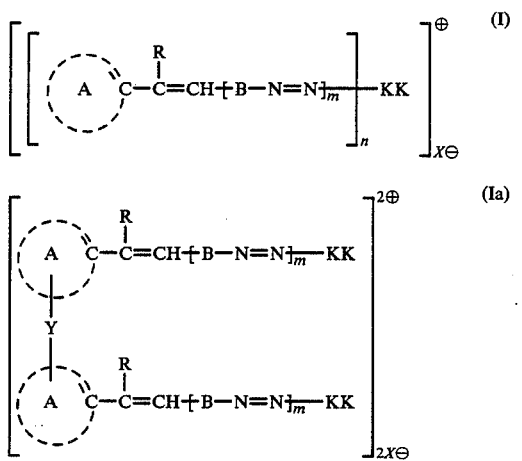

in which
- A is the complement to a heterocyclic 5- or 6-membered ring which has a quaternised N atom as a ring member, which can contain further hetero atoms and which can be substituted or/and be fused with carbocyclic or heterocyclic rings,
- R is hydrogen, cyano or $C_2$–$C_3$-alkylene which is bonded to an N atom of ring A to form a 5- or 6-membered ring,
- B is substituted or unsubstituted phenylene or naphthylene,
- m and n independently of each other are the numbers 1 or 2, in the formula (I) at least one of the two symbols m and n being the number 2 and where in the case m=2 the two B's are identical or different,
- KK is the radical of a coupling component
- $X^\ominus$ is an anion and Y is a bridge member.

A and the

configuration together are a heterocyclic 5- or 6-membered ring which contains a quaternised N atom as a ring member. This ring can also contain further hetero atoms (N, O or S), for example one or two, in particular one. This ring can be fused with one or more heterocyclic or preferably carbocyclic rings, in particular a benzo or naphtho ring. The stated rings and ring systems can also carry further substituents, except for the substituent on the N atom which leads to quaternisation thereof. Examples of such substituents are nitro, halogen, cyano, $C_1$–$C_4$-alkyl, $C_1$–$C_4$-alkoxy, acetylamino and dimethylamino. The substituent on the quaternised nitrogen atom can be for example phenyl, $C_1$–$C_8$-alkyl, $C_2$–$C_8$-alkenyl or $C_3$–$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy.

A is for example the complement to a pyrimidine, pyridine, quinoline, thiazole, imidazole, oxazole or pyrrole ring, it being possible for these rings, which are quaternised at the N atom, to be fused with carbocyclic rings, preferably with a benzo or naphtho ring, and to be further substituted. Examples of substituents on the quaternised N atom and of additional substituents are listed in the preceding paragraph.

In particular, A is the complement to a quaternised pyridine ring which can be substituted or/and be fused with carbocyclic rings.

In practically important compounds of the formulae (I) and (Ia), A is the complement to one of the following rings:

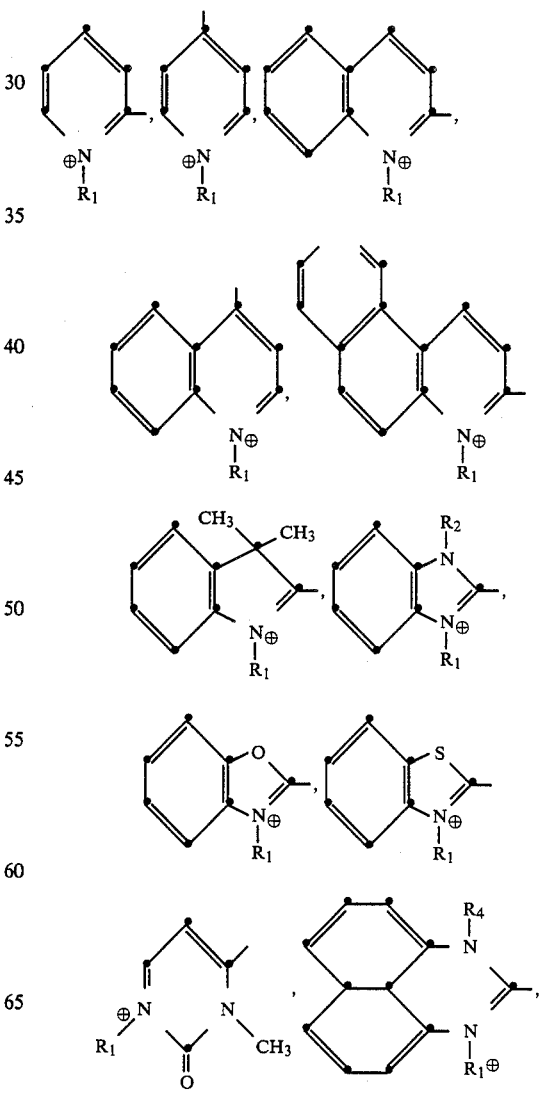

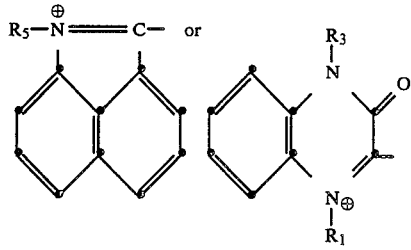

optionally these rings are substituted, in addition to the substituents $R_1$–$R_5$, by nitro, halogen cyano, $C_1$–$C_4$-alkyl, $C_1$–$C_4$-alkoxy, acetylamino or dimethylamino, and in which $R_1$, $R_2$, $R_3$ and $R_4$, independently of one another, are $C_1$–$C_8$-alkyl $C_2$–$C_8$-alkenyl, or $C_3$–$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy, and $R_5$ is phenyl or is defined as $R_1$.

A is in particular the complement to one of the following rings:

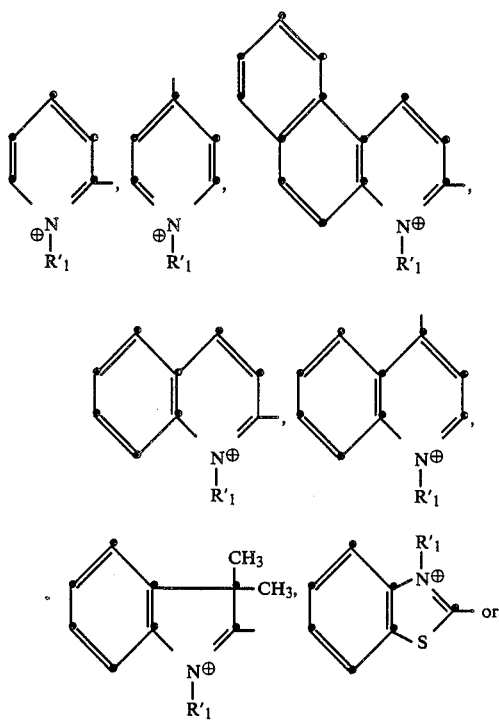

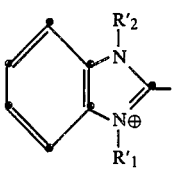

in which $R'_1$ and $R'_2$, independently of each other, are $C_1$–$C_4$-alkyl, benzyl, cyclohexyl, hydroxyalkyl or $C_3$–$C_4$-alkenyl and the stated rings are otherwise unsubstituted or substituted by halogen, cyano, $C_1$–$C_4$-alkyl, $C_1$–$C_4$-hydroxyalkyl or $C_1$–$C_4$-alkoxy, and preferably the complement to one of the rings

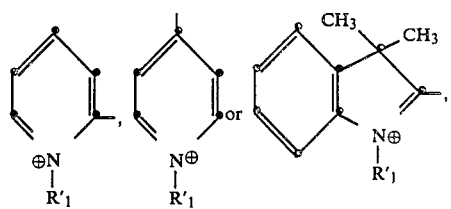

in which the $R'_1$s independently of one another are $C_1$–$C_4$-alkyl.

A is particularly preferably the complement to a pyridine ring which can be substituted and/or fused with carbocyclic rings, preferred fused-on rings and substituents being mentioned above. A is in particular the complement to a pyridine ring whose N atom is quaternised with $C_1$–$C_4$-alkyl, especially methyl, and which can be additionally substituted by one or two $C_1$–$C_4$-alkyl groups, the link to the

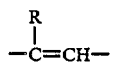

group being effected in the 2- or 4-position.

In likewise noteworthy compounds of the formula (I) and (Ia) A is the complement to a pyridinium or 3,3-dimethylindolenium ring of the above formulae in which $R'_1$ is methyl.

A $C_2$–$C_3$-alkylene group R which is bonded to an N atom of ring A to form a 5- or 6-membered ring has for example the following structures:

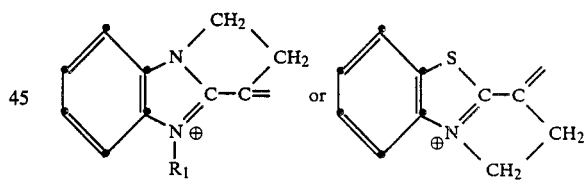

and similar. However, preferably R is hydrogen.

In the compounds of formula (I), at least one of the two symbols m or n is the number 2. In particularly noteworthy compounds of the formula (I), m is 1 and n is 2. If n=2, then coupling components onto which 2 diazo components can be coupled, that is to say coupling components of the formula HKKH (for the definition of KK see below), are suitable. In compounds of the formula (Ia), n is preferably the number 1.

Examples of possible substituents in the phenylene or naphthylene ring B are: $C_1$–$C_4$-alkyl (for example methyl, ethyl, n- and iso-propyl), $C_1$–$C_4$-alkoxy (for example methoxy, ethoxy, n-butoxy, dimethylaminoethoxy, trimethylaminoethoxy), halogen (for example fluorine, chlorine, bromine), $SO_3H$ and acylamino (for example acetylamino). In preferred compounds, B is the phenylene ring which can carry 1 or 2 substituents from the group comprising $C_1$–$C_4$-alkyl, $C_1$–$C_4$-alkoxy and halogen.

In compounds of the formula (I) and (Ia), in particular in those of the formula (I) in which m is 2, the two B's then present in the molecule can be identical or different. For instance, one of the two B's can be unsubstituted phenylene and the other can be substituted phenylene or the two B's can be differently substituted phenylene radicals (for examples of substituents see above).

Substituted or unsubstituted phenylene B in compounds of the formulae (I) and (Ia) is preferably 1,4-phenylene, especially unsubstituted 1,4-phenylene.

KK is the radical of a coupling component customary in azo chemistry, in particular in the chemistry of azo dyes. Of the large number of possibilities, the following may be mentioned as examples: coupling components of the benzene series, of the naphthalene series, of open-chain compounds containing active methylene groups and coupling components of the heterocyclic series. Particularly interesting coupling components from these series are as follows:

(1) Benzene series
(a) phenols of the formula

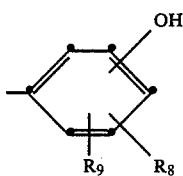

in which $R_8$ and $R_9$, independently of each other, are hydrogen, $C_1$–$C_4$-alkyl, OH, $C_1$–$C_4$-alkoxy, $SO_3H$, COOH, alkoxycarbonyl, acyl, acylamino, alkenyl, cyclopentyl, cyclohexyl, aryl, benzyl, phenethyl or halogen. Examples of such phenols are:

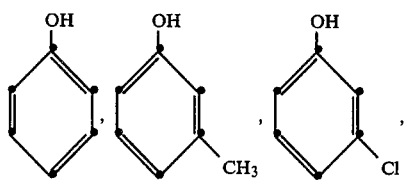

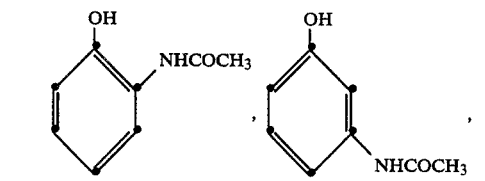

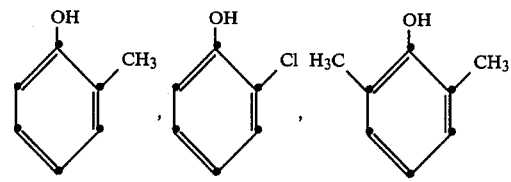

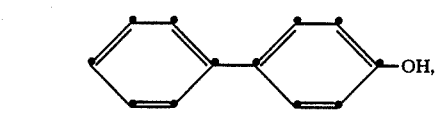

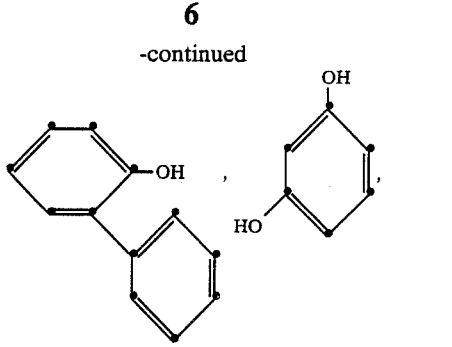

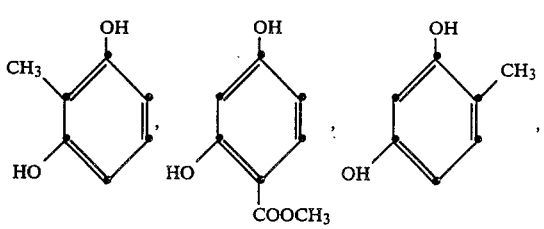

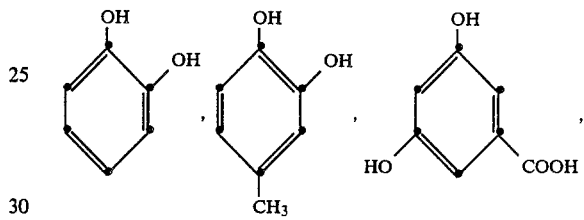

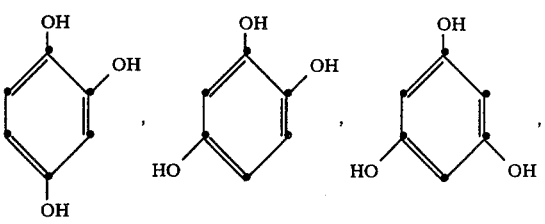

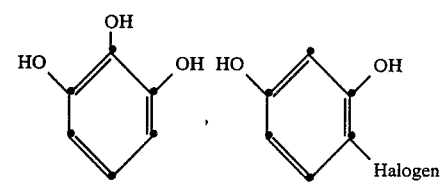

(b) benzenes of the formula

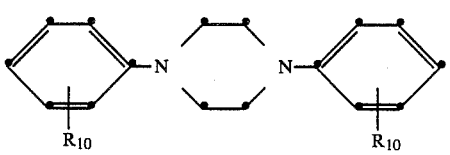

in which $R_{10}$ is hydrogen, $C_1$–$C_4$-alkyl or OH;
(c) benzenes of the formula

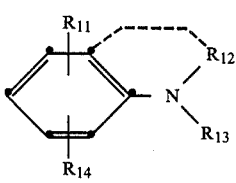

in which:
- $R_{11}$ is H, $C_1$-$C_4$-alkyl, OH, $C_1$-$C_4$-alkoxy, halogen, $SO_3H$ or acylamino,
- $R_{12}$ and, $R_{13}$ independently of each other are: H, $C_1$-$C_8$-alkyl, alkenyl, cycloalkyl, aryl, benzyl, phenethyl, $C_1$-$C_4$-alkoxy, hydroxyethyl, cyanoethyl, halogenoethyl, $$-CH_2CH_2-O-\underset{\underset{C}{\|}}{C}-C_1-C_4-\text{alkyl},$$

$$-CH_2CH_2-O-\underset{\underset{C}{\|}}{C}-O-C_1-C_4-\text{alkyl},$$

$$-CH_2CH_2-\overset{\oplus}{\underset{\underset{\text{Alkyl}-C_1-C_4}{|}}{\underset{|}{N}}}-\text{Alkyl}-C_1-C_4, \quad -CH_2CH_2-\overset{\oplus}{N}\diagup$$

where $R_{12}$ together with the benzene nucleus can also be a 5- or 6-membered saturated ring, if desired with inclusion of further hetero atoms, $R_{12}$ and $R_{13}$ together can also be a 5- or 6-membered ring, if desired with inclusion of further hetero atoms, for example a piperidine, piperazine or morpholine ring, $R_{14}$ is H, $C_1$-$C_4$-alkyl, halogen, $CF_3$, OH, $C_1$-$C_4$-alkoxy or amino; for example:

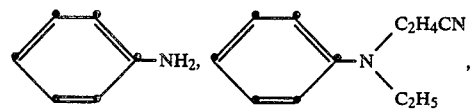

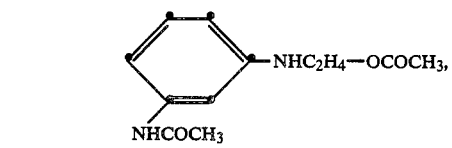

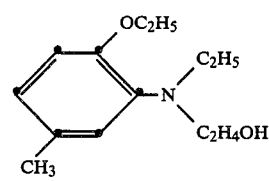

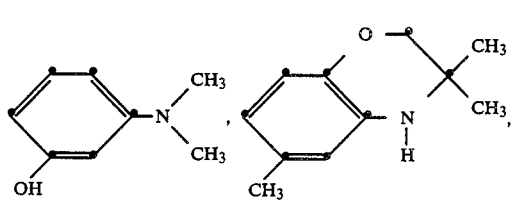

-continued

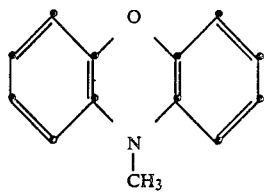

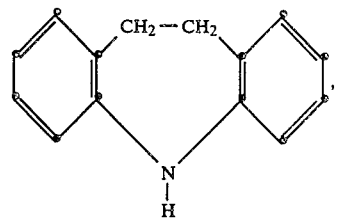

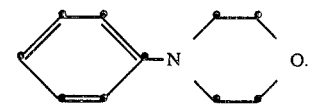

(2) Naphthalene series
(a) α-Naphthols of the formula

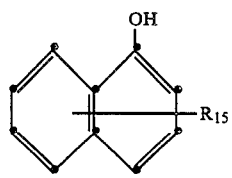

in which $R_{15}$ is hydrogen, OH or $SO_3H$, for example:

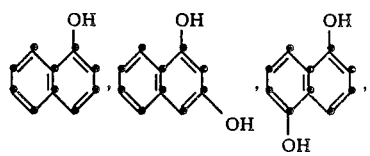

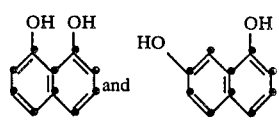

(b) β-Naphthols of the formula

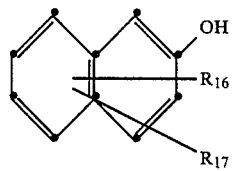

in which:
$R_{16}$ is hydrogen, OH, $SO_3H$ or $SO_2NH_2$,
$R_{17}$ is hydrogen,

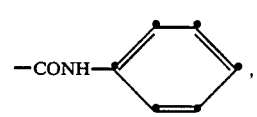

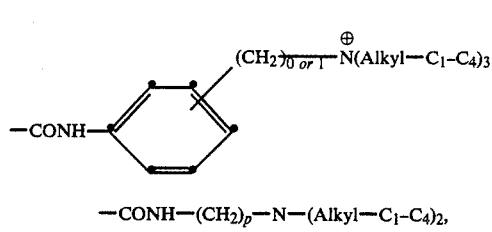

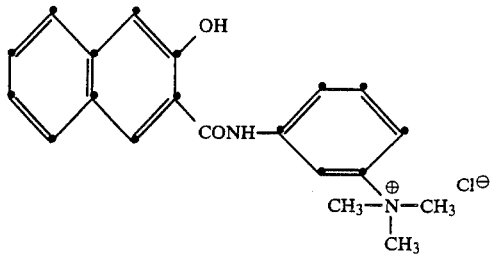

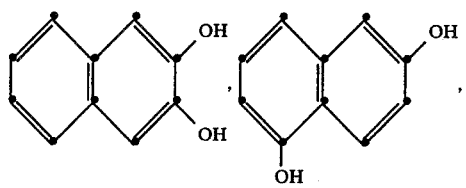

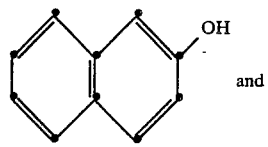

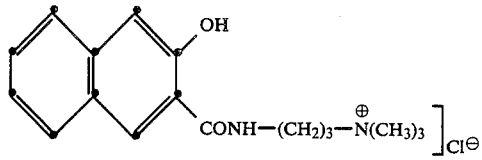

and
p is 2 or 3, X⊖=anion; for example:

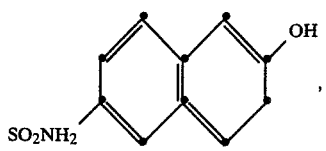

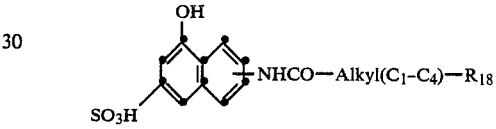

(c) Naphthols of the formula

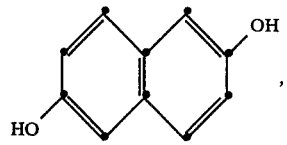

in which
R$_{18}$ is a basic amino group or a cationic ammonium group; for example

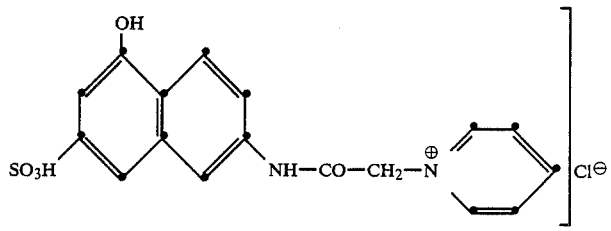

(d) Naphthols as described in DE-A No. 3,114,087 which have the formula

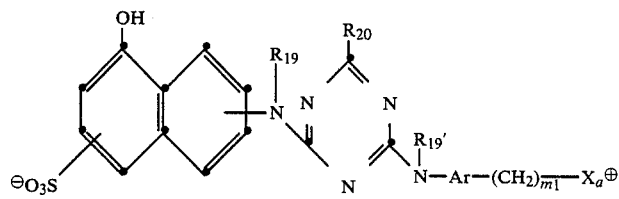

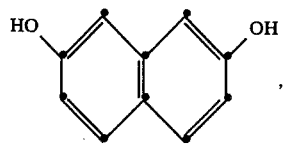

in which
R$_{19}$ is hydrogen or C$_1$-C$_4$-alkyl,
Ar is arylene, in particular phenylene,
R$_{20}$ is halogen, hydroxyl, C$_1$-C$_4$-alkoxy or a monosubstituted or disubstituted amino group,
m$_1$ is 0 or 1 and $X_a^{(+)}$ is an ammonium group, and in which the cyclic and acyclic radicals can carry further nonionic substituents;

for example:

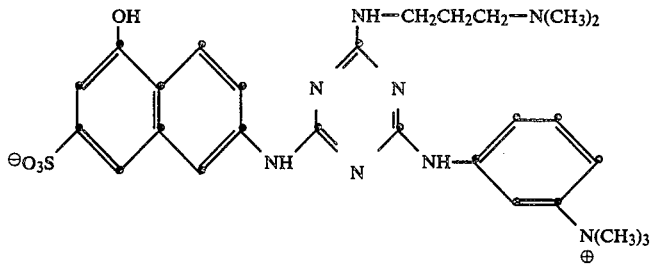

(e) Naphthols as described in EP-A No. 065,595 of the formula

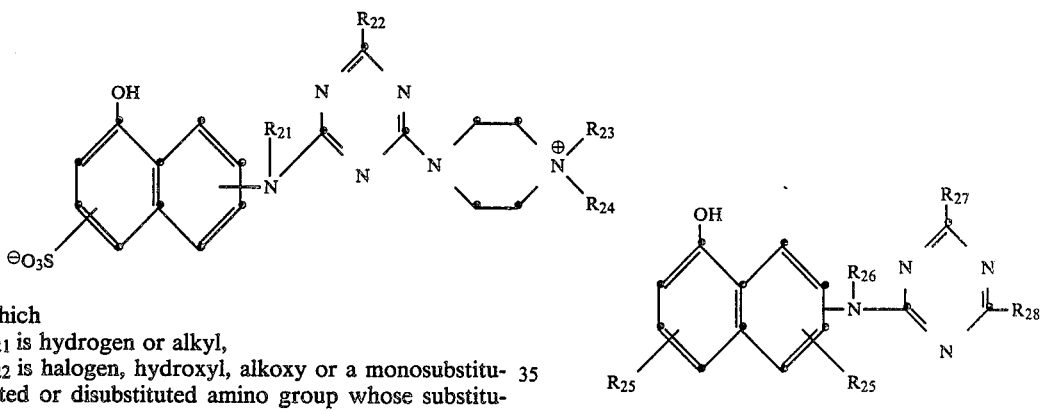

in which
- $R_{21}$ is hydrogen or alkyl,
- $R_{22}$ is halogen, hydroxyl, alkoxy or a monosubstituted or disubstituted amino group whose substituents can be cyclised—if desired via a hetero atom—to form a 5- or 6-membered nitrogen heterocycle, for example to form a piperidine, piperazine or morpholine ring,
- $R_{23}$ and $R_{24}$ independently of each other are hydrogen, alkyl, alkenyl or aralkyl, and in which the cyclic and acyclic radicals can carry further substituents, for example:

in which:
- $R_{25}$ is —$SO_3H$ or a salt thereof,
- $R_{26}$ is hydrogen or $C_1$-$C_4$-alkyl,
- $R_{27}$ is halogen, OH, alkoxy or a monosubstituted or disubstituted amino group, including a 5- or 6-membered cyclic amine,
- $R_{28}$ is a substituted piperazine of the formula

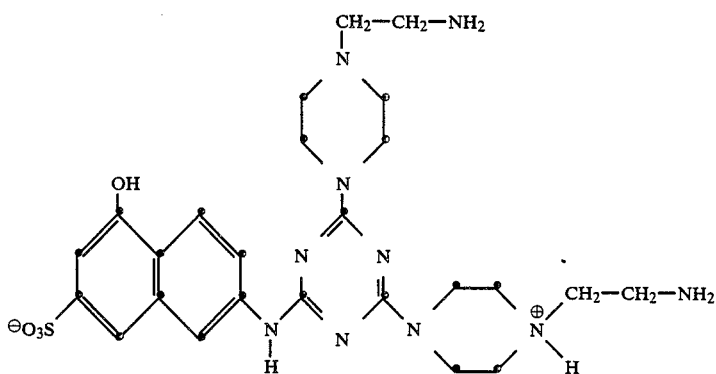

(f) Naphthols as described in DE-A No. 3,224,786 of the formula

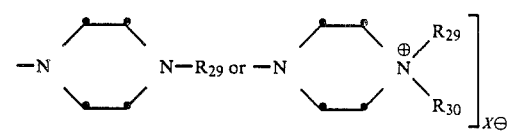

in which $R_{29}$ and $R_{30}$ are H, alkyl, alkenyl, aminoalkyl or aralkyl; and X is an anion; for example:

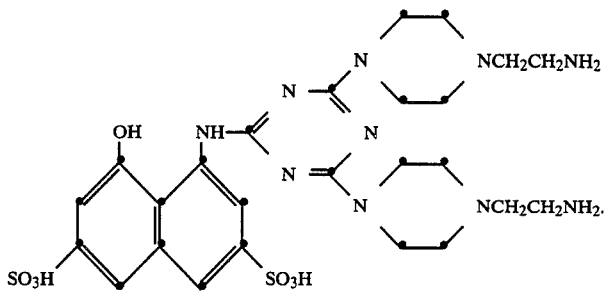

(g) Naphthols of the formula

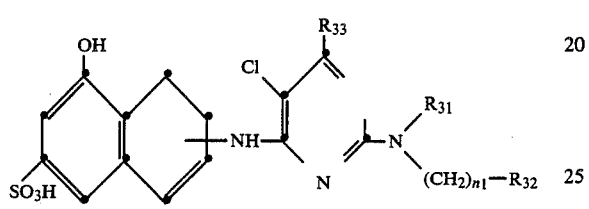

in which:
$R_{31}$ is hydrogen or $C_1$–$C_4$-alkyl,
$R_{32}$ is a basic amino group or a cationic ammonium group or
$R_{31}$ together with $R_{32}$ is bonded with inclusion of the N atom to form a heteroaliphatic ring, for example one of those of the formula

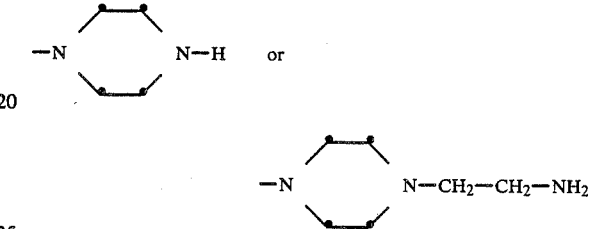

$R_{33}$ is halogen, OH, alkoxy or a monosubstituted or disubstituted amino group and
$n_1$ is the numbers 2, 3 or 4.

(h) Naphthols as described in DE-A No. 3,133,568 of the formula

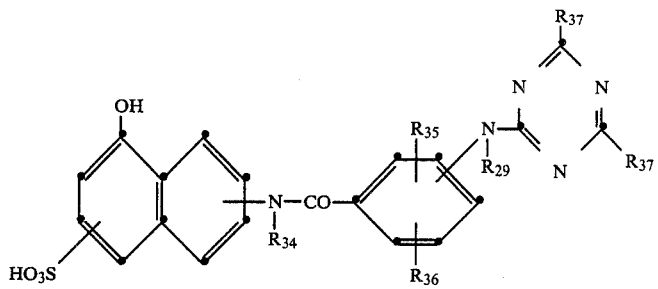

in which $R_{34}$ is hydrogen or alkyl,
$R_{35}$ and $R_{36}$ independently of each other are hydrogen, alkyl, alkoxy or halogen, and
$R_{37}$ is hydroxyl, alkoxy or a monosubstituted or disubstituted amino group or a cyclic amino group which can be further substituted,
for example:

(i) Bis-naphthols of the formula

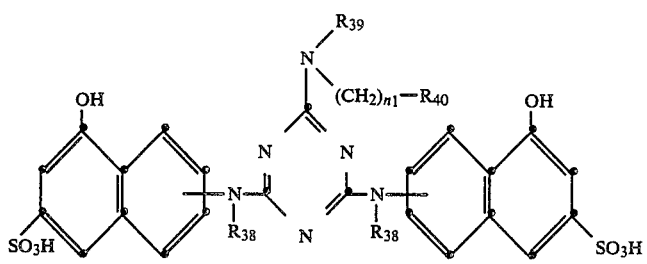

in which
- R$_{38}$ is hydrogen or C$_1$–C$_4$-alkyl,
- R$_{39}$ is hydrogen or C$_1$–C$_4$-alkyl,
- R$_{40}$ is a basic amino group or a cationic ammonium group, or
- R$_{39}$ together with R$_{40}$ is a heteroaliphatic ring which can in turn be substituted, for example a ring of the formula

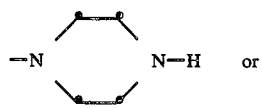 or

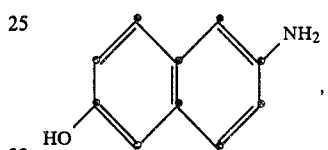

and
n$_1$ is the numbers 2, 3 or 4; for example:

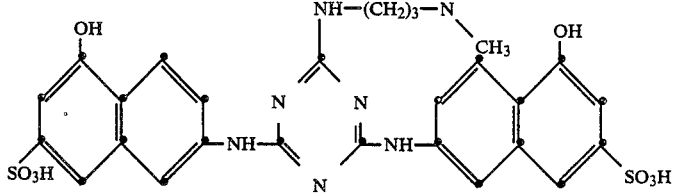

(k) α-Naphthylamines of the formula

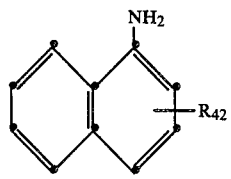

in which R$_{42}$ is hydrogen, OH or SO$_3$H, for example:

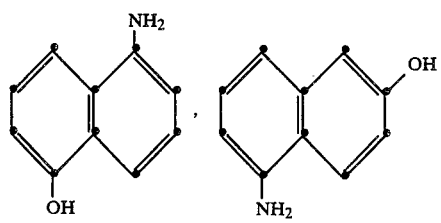

(l) β-Naphthylamines of the formula

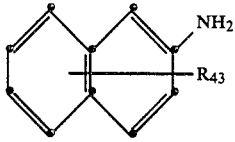

in which R$_{43}$ is hydrogen, OH, NH$_2$ or SO$_3$H, for example:

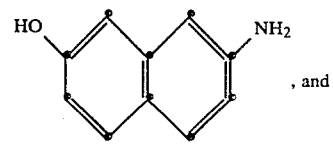

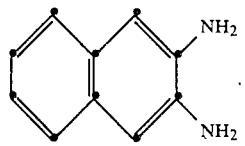, and

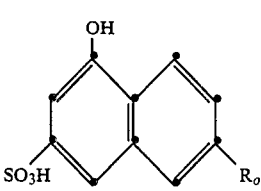

(m) α-Naphthols as described in DE-A No. 2,915,323 of the formula in which $R_o$ is hydrogen, $NH_2$, $(C_1-C_4)$alkylcarbonylamino, benzoylamino whose phenyl radical can be substituted by 1 or 2 substituents from the series comprising halogen, $NO_2$, $NH_2$, $C_1-C_4$-alkyl and $C_1-C_4$-alkoxy; or

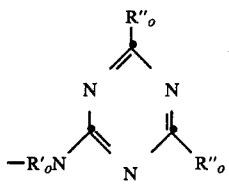

on which $R'_o$ is hydrogen or $C_1-C_4$-alkyl and $R''_o$ is OH, $NH_2$ or an aliphatic, cycloaliphatic or aromatic amino radical which has for example the formula $-N-R_a-Q-NR_bR_c$ in which $R_a$ is H or $CH_3$, Q is $C_1-C_6$-alkylene, $R_b$ and $R_c$ are H, $C_1-C_4$-alkyl, 2-hydroxyethyl, or together with the N atom are a piperidine, piperazine or morpholine ring and the group $-NR_bR_c$ can also be quaternised; for example:

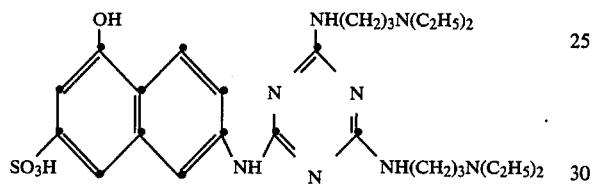

(3) Open-chain active methylene compounds as coupling components:

(a) Particularly suitable coupling components take the form of the esters and amides of acetoacetic acid. Such esters and amides can be easily prepared by reacting OH— and NH— containing compounds with diketene, as described for example in Houben-Weyl, "Methoden der organischen Chemie" [Methods of organic chemistry], Volume 7, Part 4, Oxygen compounds II.

Depending on the number of reactive amino or hydroxyl groups which are available in the molecule for reaction with the diketene, it is possible to prepare coupling components having one, two or more coupleable acetoacetyl radicals. (a) Coupling components which contain only one acetoacetyl radical per molecule have for example the formula

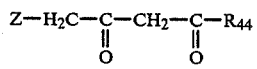

in which $R_{44}$ is substituted or unsubstituted alkoxy having 1-8 carbon atoms or cycloalkoxy, substituted or unsubstituted benzyloxy or phenoxy which can be substituted by $C_1-C_4$-alkyl, $C_1-C_4$-alkoxy, halogen, acylamino, carboxamido, sulfonamido, dialkylamino, $C_1-C_4$-alkylcarbonyl, $C_1-C_4$-alkoxycarbonyl, OH or phenyl.

$R_{44}$ is also a radical of the formula

in which $R_{45}$ is $C_1-C_4$-alkyl or preferably hydrogen and $R_{46}$ is hydrogen, substituted (for example by halogen, OH, alkoxy or amino) or unsubstituted $C_1-C_8$-alkyl or cycloalkyl or a substituted or unsubstituted benzyl radical or a phenyl radical of the formula

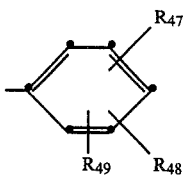

in which $R_{47}$ is hydrogen, $C_1-C_4$-alkyl, $C_1-C_4$-alkoxy, halogen, cyano, nitro, OH, dialkylamino, phenylamino,

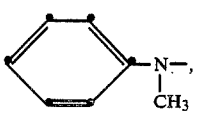

phenyl, acylamino, substituted or unsubstituted carboxamido, substituted or unsubstituted sulfonamido, $C_1-C_4$-alkylcarbonyl, $C_1-C_4$-alkoxycarbonyl, $C_1-C_4$-alkylsulfonyl, a radical of the formula $-(CH_2)_w-K^\oplus An^\ominus$ from DE-A No. 3,133,360, where $K^\oplus$ is an aliphatic or aromatic ammonium group, for example

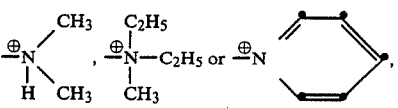

and w is 1 or 2, a radical of the formula

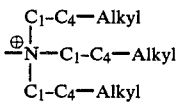

from DE-A No. 3,231,398, preferably

$R_{48}$, independently of $R_{47}$, is hydrogen, $C_1-C_4$-alkyl, $C_1-C_4$-alkoxy or halogen;

$R_{49}$, independently of $R_{47}$ and $R_{48}$, is hydrogen, halogen or $C_1-C_4$-alkyl.

$R_{46}$ can also be, together with $R_{45}$ and if desired with the inclusion of further hetero atoms, a 5- or 6-membered saturated or unsaturated ring, for example of the formula

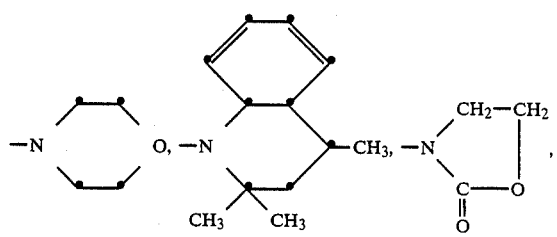

-continued

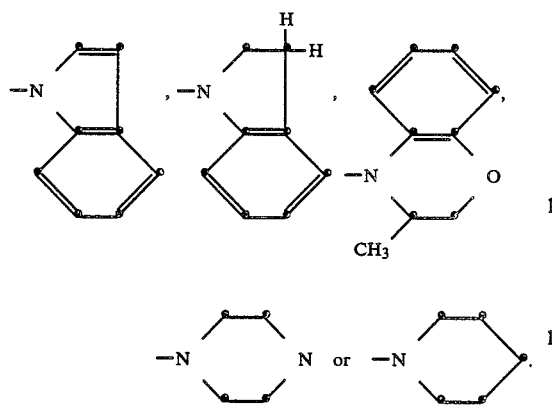

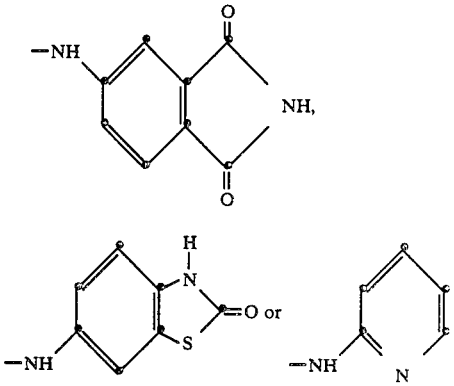

where R$_{50}$ is methyl, ethyl, methoxy, ethoxy or preferably hydrogen or acetylamino.

R$_{44}$ is also defined as a heterocyclic amine, for example of the formula

R$_{44}$ also is a radical of the formula

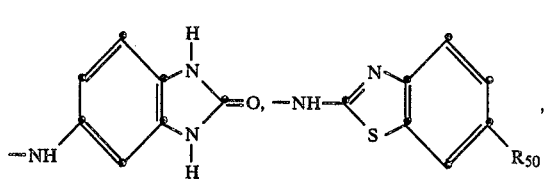

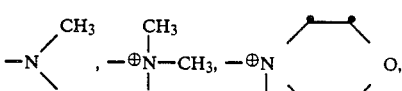

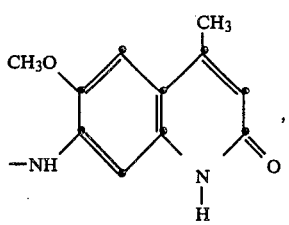

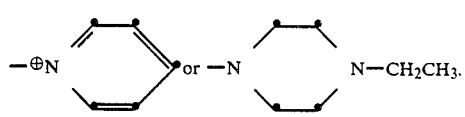

where R$_{45}$ is as defined above and

R$_{51}$ is substituted or unsubstituted alkyl having 1–8 carbon atoms, cycloalkyl, amino, alkylamino, dialkylamino, phenylamino, alkoxy or phenoxy and R$_{52}$ and R$_{53}$, independently of each other, are hydrogen, C$_1$–C$_4$-alkyl, C$_1$–C$_4$-alkoxy, halogen or dialkylamino.

Z is halogen or preferably hydrogen or an aliphatic or aromatic, substituted or unsubstituted amino or ammonium group as described in EP-A No. 16,726 and EP-A No. 97,232, for example of the formula

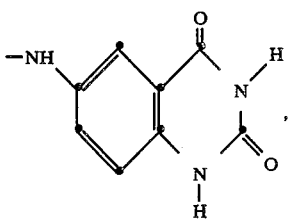

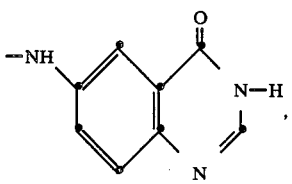

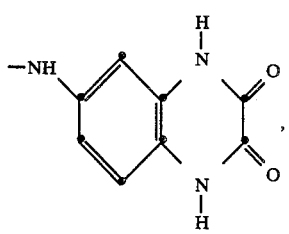

(b) Coupling components which contain 2 coupleable acetoacetyl radicals per molecule have the formula

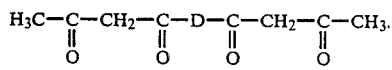

in which D is the radical of a dihydric aliphatic alcohol, for example ethylene glycol, of an aliphatic amino alcohol, for example aminoethanol, of an aliphatic or aromatic diamine, for example diaminopropane, piperazine, m- or p-phenylenediamine, bis-4,4'-aminophenylurea, of an aminophenol or aminonaphthol, for example m-aminophenol, 2-amino-7-hydroxynaphthalene, of a dihydroxybenzene or dihydroxynaphthalene, for example resorcinol or 2,7-dihydroxynaphthalene, of a hydroxybenzamide or aminobenzamide, for example anthranilamide or salicylamide, or of an aminobenzenesulfonamide, where all these radicals can be further substituted by $C_1$-$C_4$-alkyl, $C_1$-$C_4$-alkoxy or halogen.

(B) Esters and amides of malonic acid as coupling components have the formula

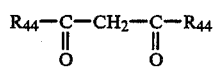

where $R_{44}$ is as defined above, for example

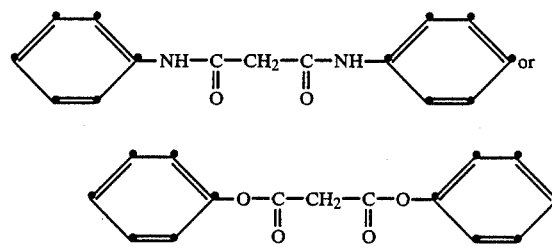

(C) Esters and amides of cyanoacetic acid as coupling components have for example the formula NC—CH$_2$—C—R$_{44}$, where $R_{44}$ is as defined above, for example

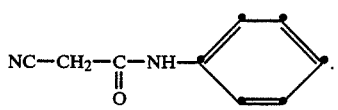

(4) Coupling components of the heterocyclic series (a) pyridines as described in DE-A Nos. 3,201,268 and 3,206,092, for example those of the formula

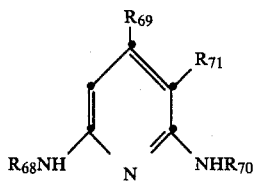

in which: $R_{71}$ is CN, $C_1$-$C_4$-alkyl, NO$_2$ or halogen; $R_{68}$ and $R_{70}$ are H, $C_1$-$C_4$-alkyl, alkenyl, cyclohexyl, aryl, benzyl, phenethyl or one of the radicals of $R_{68}$ and $R_{70}$ is phenyl which can be monosubstituted or polysubstituted by Cl, CH$_3$, C$_2$H$_5$, tert.-butyl, phenoxy, methoxy, ethoxy, propoxy or butoxy and the other of the radicals $R_{68}$ and $R_{70}$ is unsubstituted or $C_1$-$C_4$-alkoxy- or phenyl-substituted $C_2$-$C_8$-alkyl, allyl, cyclopentyl, cyclohexyl or methylcyclohexyl,

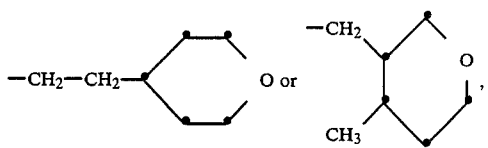

and $R_{69}$ is hydrogen, CH$_3$, C$_2$H$_5$ or C$_3$H$_7$; for example

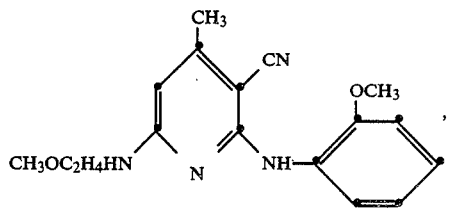

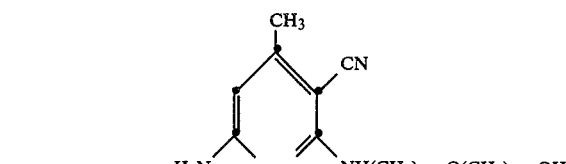

(b) pyridines as described in DE-A Nos. 2,436,897 and 3,296,092, for example those of the formula:

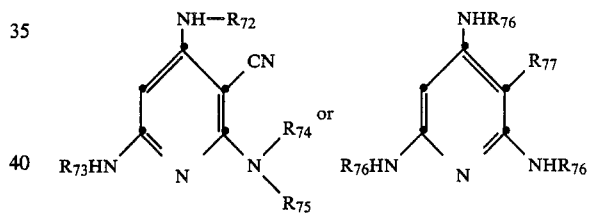

in which:

$R_{72}$ and $R_{73}$ are a $C_1$-$C_8$-alkyl group which can be substituted by $C_1$-$C_8$-alkoxy, $R_{74}$ and $R_{75}$ are a hydrogen atom, a $C_1$-$C_8$-alkyl group which can be substituted by hydroxyl, amino, $C_1$-$C_8$-alkoxy or NT$_1$T$_2$, a cycloalkyl group which can be substituted by methyl radicals, a benzyl group which can be substituted by 1 to 3 chlorine, $C_1$-$C_4$-alkyl or $C_1$-$C_4$-alkoxy or together are the radicals —(CH$_2$)$_4$—, —(CH$_2$)$_3$—, —(CH$_2$)$_4$—, —(CH$_2$)$_3$—O—(CH$_2$)$_3$—, —(CH$_2$)$_3$—NCH$_3$—(CH$_2$)$_3$—, —(CH$_2$)$_3$—S—(CH$_2$)$_3$— or —NH—(CH$_2$)$_3$— and T$_1$ and T$_2$ are a $C_1$-$C_8$-alkyl group, $R_{76}$ is H, $C_1$-$C_4$-alkyl, alkenyl, cyclohexyl, aryl or benzyl, $R_{77}$ is CN, COOH, COOAlkyl, COOCyclohexyl, COOAryl, COOBenzyl, alkyl($C_1$-$C_4$), NO$_2$, halogen, SO$_2$-alkyl($C_1$-$C_4$);

for example:

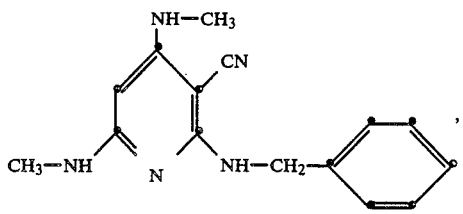

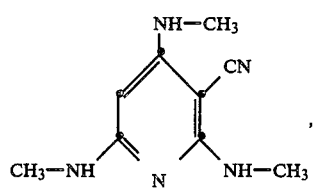

(c) pyridones of the formula

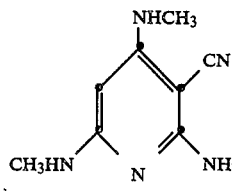

in which:

R$_{79}$ is substituted or unsubstituted C$_1$–C$_8$-alkyl, or hydrogen and

R$_{78}$ is CN, CONH$_2$ and SO$_2$NH$_2$; for example:

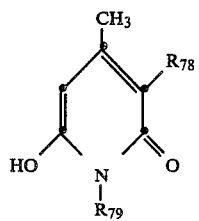

(d) pyridones as described in CH-A No. 628,078 of the formula:

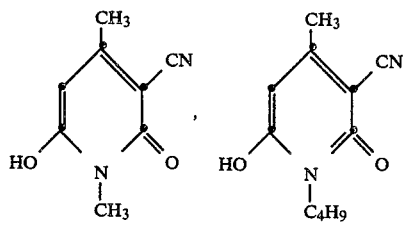

in which:

R$_{82}$, R$_{83}$ and R$_{84}$ independently of one another are H or C$_1$–C$_4$-alkyl, R$_{85}$ is H or C$_1$–C$_{20}$-alkyl and X is an anion; for example:

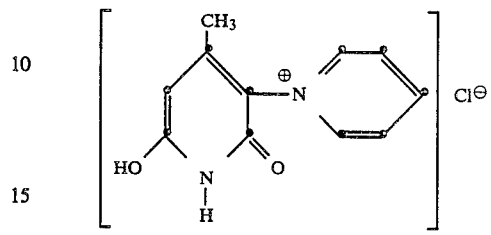

(e) pyridones as described in DE-A No. 3,037,911 of the formula

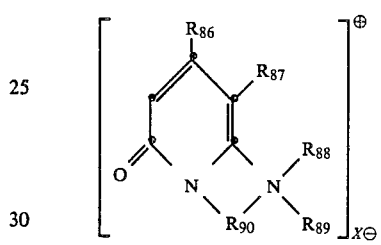

in which:

R$_{86}$ is H, C$_1$–C$_4$-alkyl, cycloalkyl, aryl, aralkyl, heterocycle, CN, OH, COOR$_{91}$, CONR$_{91}$R$_{92}$, COR$_{92}$ or CONH$_2$, (R$_{91}$ and R$_{92}$=C$_1$–C$_4$-alkyl, cycloalkyl, aryl, aralkyl, heterocycle where R$_{92}$ can also be H)

R$_{87}$ is R$_{86}$, halogen or NO$_2$

R$_{88}$ and R$_{89}$ are C$_1$–C$_4$-alkyl, cycloalkyl, aryl, aralkyl, alkenyl where R$_{89}$ can also be H, R$_{90}$ is a bridge member and X is an anion; for example:

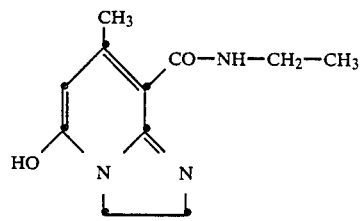

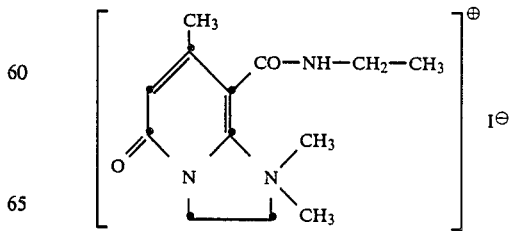

(g) quinolines of the formula

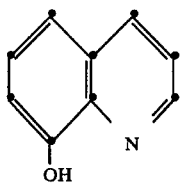

(h) indoles of the formulae:

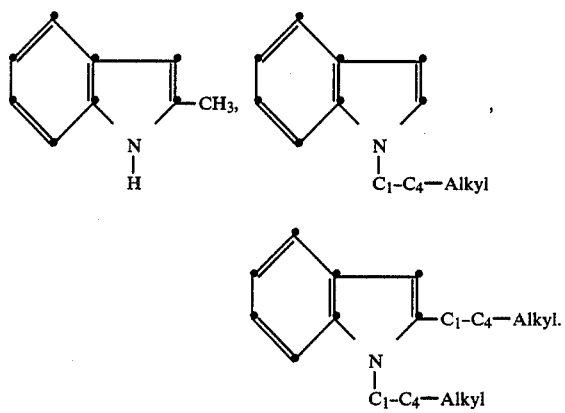

(i) pyrimidines of the formula:

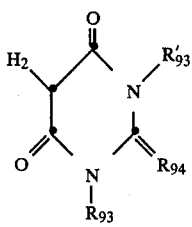

in which
R₉₃ and R′₉₃ are hydrogen or C₁-C₄-alkyl and
R₉₄ is O or N—CN; for example:

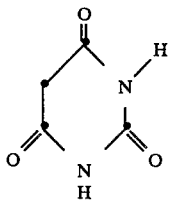

(k) pyrimidines as described in EP-A No. 87,037 of the formula:

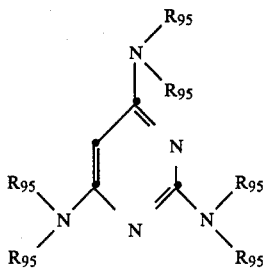

in which:
each $R_{95}$ independently of the others is H, $C_1$–$C_4$-alkyl, alkenyl, cyclopentyl, cyclohexyl, aryl, benzyl and phenethyl;
for example

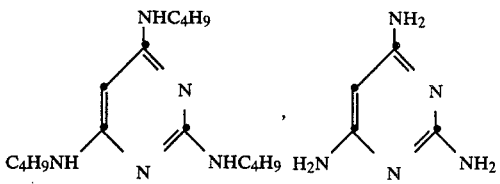

(l) pyrazoles as described in EP-A No. 87,037 of the formula

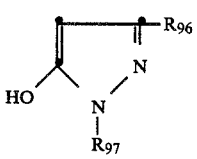

in which:
$R_{97}$ is H, $C_1$–$C_4$-alkyl, alkenyl, cyclohexyl, aryl, benzyl and phenylethyl, and
$R_{96}$ is $R_{97}$ or $COOR_{97}$ or $CONR_{97}$, for example

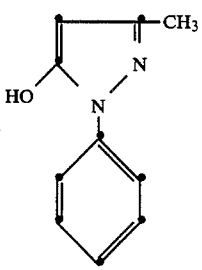

(m) pyrazoles as described in EP-A No. 87,037 of the formula

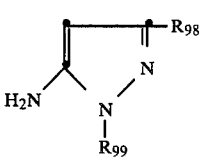

in which:
$R_{99}$ is H, $C_1$–$C_4$-alkyl, alkenyl, cyclohexyl, aryl, benzyl and phenethyl and
$R_{98}$ is $R_{99}$ or $COOR_{99}$ or $CONR_{99}$; for example

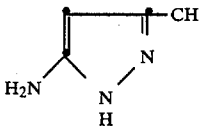
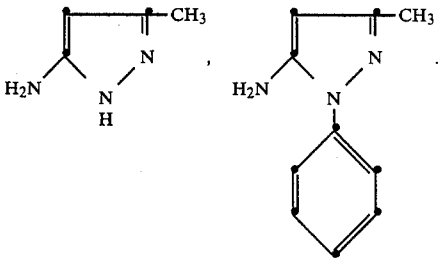

(n) pyrazoles as described in EP-A No. 72,508 and EP-A No. 75,773 of the formula:

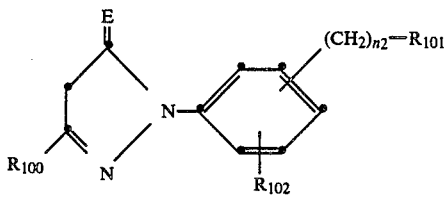

in which:
R$_{100}$ is C$_1$-C$_4$-alkyl or C$_1$-C$_4$-alkoxycarbonyl,
E is NH or O,
R$_{102}$ is hydrogen or a nonionic substituent
n$_2$ is 0, 1 or 2 and

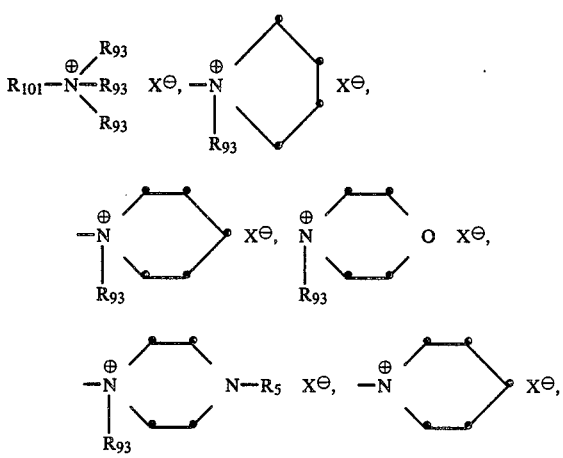

in which R$_{93}$ is hydrogen and C$_1$-C$_4$-alkyl and X is an anion, for example:

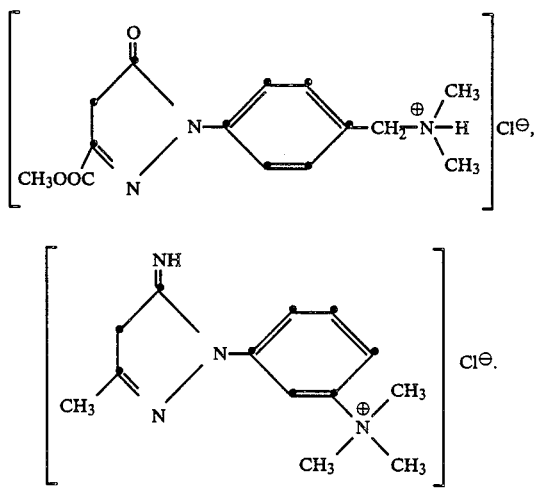

As far as in the above definitions and in the remaining description alkyl groups, as such or as part of assembled groups, are referred to as "substituted or unsubstituted", examples of possible substituents, unless otherwise stated, are: hydroxyl, cyano, halogen (for example Cl, Br), C$_1$-C$_4$-alkoxy, phenyl (which can be substituted 1-3 times by halogen, methyl or methoxy), amino, alkylamino or dialkylamino. Again, unless otherwise stated, alkyl groups have, as such or as part of assembled groups, preferably 1-8, in particular 1-4, C atoms, and cycloalkyl groups preferably have 5 to 6 C atoms. Examples of groups referred to as nonionic substituents are C$_1$-C$_4$-alkyl, C$_1$-C$_4$-alkoxy and halogen. Aryl is to be understood as meaning preferably naphthyl and in particular phenyl.

It will be readily understood that, for compounds of the formula (I) in which n=2, the only possible coupling components are those which can be coupled onto two diazo components. Examples thereof are the coupling components mentioned above in 3A(b), resorcinol and others.

In compounds according to the invention, KK can thus be for example the radical of a substituted or unsubstituted phenol, of a substituted or unsubstituted dihydroxybenzene, of a substituted or unsubstituted aniline, of a substituted or unsubstituted diphenylamine, of a substituted or unsubstituted naphthol, of a substituted or unsubstituted naphtholsulfonic acid, of a substituted or unsubstituted dihydroxynaphthalene, of a substituted or unsubstituted naphthylamine, of a substituted or unsubstituted hydroxynaphthylamine, of a substituted or unsubstituted 2,6-diaminopyridine, of a substituted or unsubstituted dihydroxypyridine, of a substituted or unsubstituted pyridone, of a substituted or unsubstituted quinoline, of a substituted or unsubstituted benzimidazole, of a substituted or unsubstituted benzoquinoline, of a substituted or unsubstituted pyrimidine, of a substituted or unsubstituted pyrimidone, of a substituted or unsubstituted indole, of a substituted or unsubstituted pyrazole or of a derivative of acetoacetic acid, malonic acid or cyanoacetic acid. Examples of possible substituents can be found in the preceding sections (1) to (4) (list of possible coupling components) for the relevant types of coupling component.

In particularly noteworthy compounds of the formula (I) and (Ia), KK is the radical of a substituted or unsubstituted acetoacetylamide or acetoacetyl ester, of a substituted or unsubstituted pyrimidine, of a substituted or unsubstituted pyrimidone, of a substituted or unsubstituted 8-hydroxyquinoline, of a substituted or unsubstituted benzimidazole, of a substituted or unsubstituted naphthol, of a substituted or unsubstituted pyridone, of a substituted or unsubstituted naphtholsulfonic acid, of a substituted or unsubstituted aniline or of a substituted or unsubstituted dihydroxybenzene, in particular of a substituted or unsubstituted acetoacetylamide or acetoacetyl ester or pyridone. Examples of these coupling components and of their possible substituents can be found in the preceding sections (3)(A)(a), (3)(A)(b), (4)(c), (d), (e), (g), (i), (k); (1)(a), (c); (2)(a), (b), (c), (d), (e), (f), (g), (h), (j), (m).

In especially noteworthy compounds according to the invention, KK is the radical of a coupling component of the following formulae:

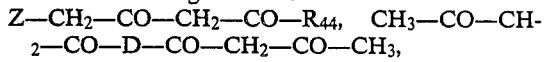

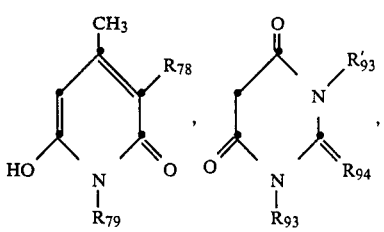

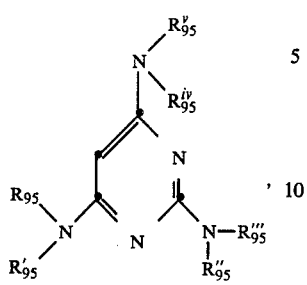

in which

Z is hydrogen, halogen or a substituted or unsubstituted aliphatic, cycloaliphatic or aromatic amino or ammonium group, in particular of the formula

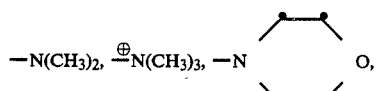

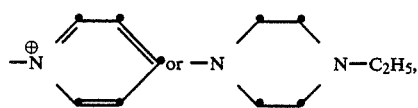

$R_{44}$ is substituted or unsubstituted alkoxy, benzyloxy or phenoxy, an unsubstituted or monosubstituted or disubstituted amino group, a 5- or 6-membered cyclic saturated or unsaturated amino group, D is the radical of a dihydric aliphatic alcohol, of an aliphatic amino alcohol, of an aliphatic or aromatic diamine, of an aminophenol, of an aminonaphthol, of a dihydroxybenzene, of a dihydroxynaphthalene, of a hydroxybenzamide, of an aminobenzamide, or of an aminobenzenesulfonamide, it being possible for all these radicals to be substituted by $C_1$-$C_4$-alkyl, $C_1$-$C_4$-alkoxy or halogen;

$R_{78}$ is CN, $CONH_2$ or $SO_2NH_2$, $R_{79}$ is hydrogen or substituted or unsubstituted $C_1$-$C_8$-alkyl, $R_{93}$ and $R'_{93}$, independently of each other, are hydrogen or $C_1$-$C_4$-alkyl, $R_{94}$ is O or N—CN and $R'_{95}$, $R''_{95}$, $R_{95}$, $R^{iv}_{95}$, $R^v_{95}$ and $R'''_{95}$ independently of one another, are each hydrogen, $C_1$-$C_4$-alkyl, $C_2$-$C_4$-alkenyl, cyclopentyl, cyclohexyl, aryl, in particular phenyl, benzyl or phenethyl. Therein Z is in particular hydrogen, halogen or

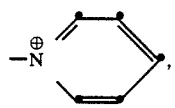

preferably hydrogen and $R_{44}$ preferably is as defined in the above section (3)(A)(a) and can be in particular —NH—$R'_{49}$ or

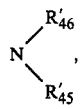

in which $R'_{46}$ is $C_1$-$C_4$-alkyl, $R''_{45}$ is $C_1$-$C_4$-alkyl or phenyl or $R_{45}$ and $R_{46}$ together are the complement to a morpholine, piperidine, piperazine, pyrrolidine or

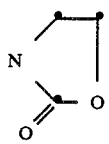

ring and $R'_{49}$ is hydrogen, phenyl($C_1$-$C_4$)-alkyl, cyclohexyl, cyclohexyl-($C_1$-$C_4$)-alkyl, benzoyl, naphthyl or a group of the formula

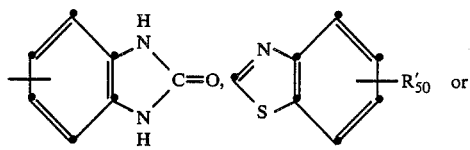

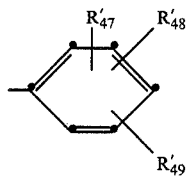

wherein $R'_{50}$ is hydrogen, halogen, $C_1$-$C_4$-alkyl or $C_1$-$C_4$-alkoxy, $R'_{47}$ is hydrogen, halogen, $C_1$-$C_4$-alkyl, $C_1$-$C_4$-alkoxy, —NHCO-alkyl($C_1$-$C_4$) or —$SO_2NH_2$, $R'_{48}$ is hydrogen, halogen, $C_1$-$C_4$-alkyl or $C_1$-$C_4$-alkoxy and $R'_{49}$ is hydrogen or halogen.

Also of interest are those compounds of the formulae (I) and (Ia) in which KK is the radical of one of the 3 heterocyclic coupling components of the above formulae (pyridone, pyrimidone and pyrimidine compounds).

Of particular interest are also those compounds of the formulae (I) and (Ia) in which KK is the radical of one of the following coupling components:

$CH_3$—CO—$CH_2$—CO—D'—CO—$CH_2$—CO—$CH_3$,

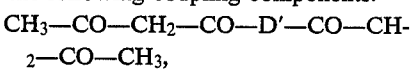

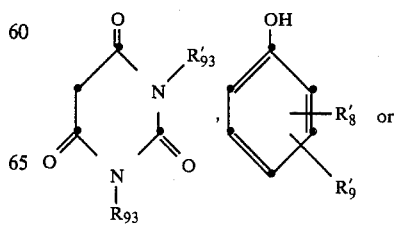

-continued

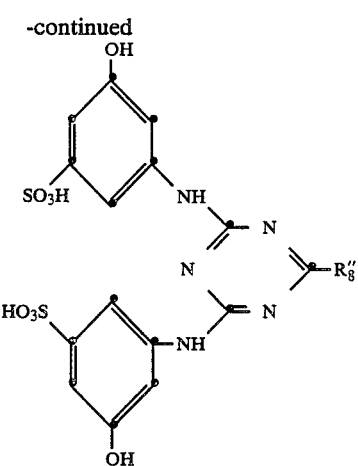

in which D′ is 1,4-piperazinyl or

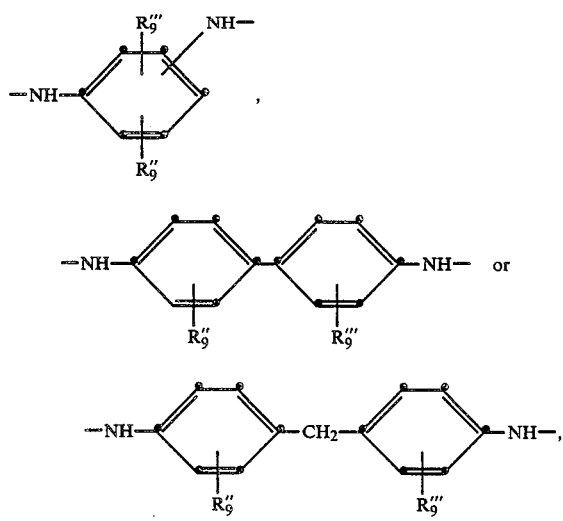

$R''_9$ and $R_9$, independently of each other, each are hydrogen, $C_1$-$C_4$-alkyl, $C_1$-$C_4$-alkoxy or halogen, $R'_8$ and $R'_9$, independently of each other, are hydrogen, $C_1$-$C_4$-alkyl, OH, $C_1$-$C_4$-alkoxy or halogen, $R''_8$ is —NH(CH$_2$)$_x$—N(Alk)$_2$, x is a number from 2 to 4, Alk $C_1$-$C_4$-alkyl, $R_{93}$ and $R'_{93}$, independently of each other, are hydrogen or $C_1$-$C_4$-alkyl.

The acetoacetyl ester coupling component of the formula

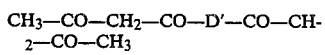

and the coupling component of the above formula which contains the 2 J acid radicals are suitable in particular for those compounds of the formula (I) in which n is 2.

It will be readily understood that the radicals of acetoacetic acid derivatives can be written in various tautomeric forms, for example

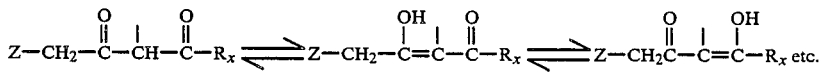

If one of these forms is used, this of course means that all possible tautomeric forms are included.

The anions X⁻ in the compounds of the formulae (I) and (Ia) can be in the case of dyes customary colourless organic and inorganic anions; examples are: chloride, bromide, iodide, hydroxyl, hydrogensulfate, sulfate, nitrate, dihydrogen phosphate, hydrogenphosphate, phosphate, carbonate, methosulfate, ethosulfate, acetate, propionate, benzenesulfonate, toluenesulfonate, formate, lactate, oxalate and methoxyacetate; but it is also possible for mixtures of various anions to be present.

The charge on the methine-azo compounds of the formula (I) and (Ia) according to the invention is by definition cationic. Since these compounds can also contain anionic groups such as SO$_3$H and COOH groups, the compounds are subject to the condition that the total number of all cationic and basic groups is greater by at least 1 than the total number of all anionic groups.

The bridge member Y joins the two rings A in compounds of the formula (Ia). Y is for example uninterrupted or N—, O— or/and S-interrupted alkylene, alkenylene or cycloalkylene which each can be substituted, or a -alkylenephenylene-alkylene group in which phenylene can be substituted by halogen, alkyl, alkoxy or hydroxyl. Preferably the bridge member Y joins the two rings A via the respective quaternised N atoms.

In particular Y is $C_1$-$C_8$-alkylene, $C_2$-$C_8$-alkenylene cyclohexylene, each of which can be substituted by hydroxyl, halogen or $C_1$-$C_4$-alkoxy, $C_1$-$C_4$-alkylene-phenylene-$C_1$-$C_4$-alkylene in which phenylene can be substituted by hydroxyl, methyl, methoxy or halogen, or a group of the formula

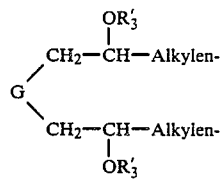

in which
$R'_3$ is hydrogen, $C_1$-$C_4$-alkyl, aralkyl or acyl and G is

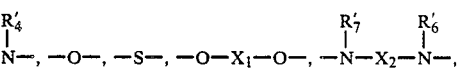

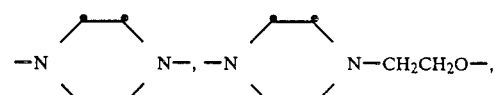

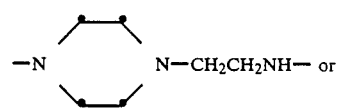

-continued

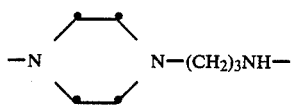

where
R'$_4$ is hydrogen, substituted or unsubstituted and uninterrupted or oxygen- or sulfur-interrupted C$_1$-C$_{21}$-alkyl, cycloalkyl or aralkyl,
R'$_5$ and R$_7$, independently of each other, are substituted or unsubstituted alkyl, phenylalkyl or phenyl,
X$_1$ is uninterrupted or —COO—,

oxygen- or sulfur-interrupted alkylene or diarylenealkylene and
X$_2$ is uninterrupted or

or oxygen-interrupted alkylene or diarylenealkylene.

The groups of the formula (II) are described in No. DE-A-3,136,259 and No. DE-A-3,205,647. The very preferred radical G has the formula

in which R''$_4$ is n-propyl, n-butyl, iso-butyl or sec.-butyl, so that Y accordingly is for example a bridge member of the formula

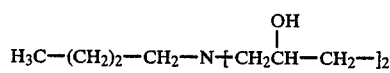

Preferred bridge members Y are: C$_1$-C$_4$-alkylene,

or a group of the formula

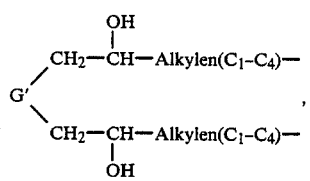

in which G' is

where R'$_7$=C$_1$-C$_8$-alkyl.

The methine-azo compounds of the formula (I) or (Ia) according to the invention are prepared in known manner, for example by diazotising methine compounds of the formula

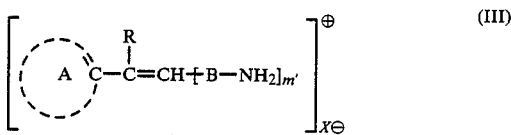

or

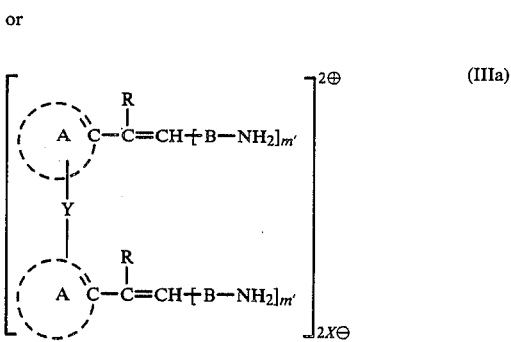

and coupling onto a coupling component H—KK or H—KK—H respectively, in which formulae the symbols A, R, B, X, n, Y and KK are as defined for the formulae (I) and (Ia) and m' is 1 or 2. If the resulting methine-azo compound also contains a further diazotisable —NH$_2$ group and if m' in the above formulae is 1, it is possible by renewed diazotisation and coupling to prepare the dyes of the formula (I) or (Ia) according to the invention where m=2. However, m' can also already be the number 2 in the compounds of the formulae (III) and (IIIa).

The diazotisation and the coupling reaction are carried out in conventional manner, advantageously in an aqueous, acid or weakly alkaline medium.

The methine-azo compounds according to the invention obtained are isolated from the reaction medium in conventional manner, or the process of preparation is conducted in such a way that a ready-to-use, concentrated solution is obtained at once.

If the compound is isolated, the isolated paste is dried or directly turned into the desired solution.

The coupling components H—KK and H—KK—H are known and can be obtained in known manner. Attention is drawn to the coupling components KK mentioned at the beginning.

The methine compounds of the formulae

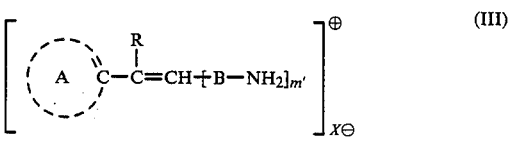

or

-continued

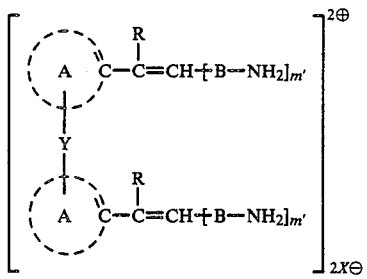

are partly known (see for example: No. DE-A-2,161,413; Zhurnal Obshchei Khimii, Vol. 43, No. 8, p. 1789–1794, Aug. 1973; U.S. Pat. No. 3,185,538, U.S. Pat. No. 3,192,195, No. FR-A-1,391,408, No. DE-A-1,248,192), or can be prepared in known manner.

In the examples section below, the preparation of such methine compounds is also described.

These compounds are obtained for example when quaternary salts of the formula

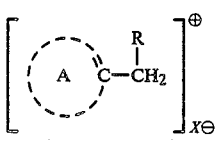

or

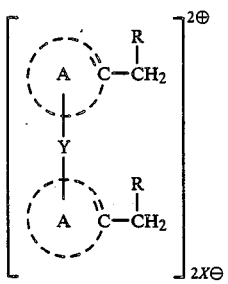

in which the symbols A, Y, R and X are as defined above, are condensed with substituted or unsubstituted aminobenzaldehydes or aminonaphthaldehydes or derivatives thereof (for example immonium salts).

The condensation is carried out at temperatures between 20° and 140° C., preferably between 50° and 110° C., in an organic solvent. Examples of suitable solvents are alcohols, such as methanol, ethanol and propanols and butanols, and also benzylalcohol, ethyl acetate, methyl benzoate, formic acid, acetic acid, $C_2$–$C_6$-glycols, dimethylformamide, dimethylacetamide, tetramethylurea, acetonitrile and benzonitrile. To speed up the condensation reaction it is possible to add basic catalysts, for example triethylamine, pyridine, piperidine, N-ethylpyridine, N-methylmorpholine, alkali metal carbonates, alkali metal acetates and acetates of inorganic or organic nitrogen bases, such as ammonium acetate or piperidine acetate.

To prepare methine compounds of the formula (III) where m'=2, it is possible, after the condensation, to diazotise the amino group of a resulting compound (III) or (IIIa) again and couple onto a coupling component B'—NH$_2$, where B and B' can be identical or different.

The quaternary salts of the formula (IV) and (Iva) are known or can be prepared in known manner.

The free amino group of the aminoaldehydes can, if desired, be protected before the condensation by means of an acetyl group which is subsequently split off again by acid hydrolysis.

However, the methine-azo compounds according to the invention can also be prepared by, for example, first diazotising an aminobenzaldehyde or aminonaphthaldehyde of the formula

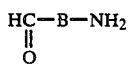

and coupling onto the coupling component KK—H or HKKH and condensing the resulting azo compound of the formula

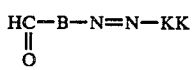

with a quaternary salt of the formula (IV) or (Iva). The preferred reaction conditions for the condensation correspond to those described above for the preparation of compounds of the formula (III) or (IIIa). The diazotisation and coupling is effected in known manner.

The methine-azo compounds of the formula (I) and (Ia) and the methine compounds of the formula (III) and (IIIa) are used in particular as dyes for dyeing and printing cationically dyeable substrates, such as wool, silk, leather, acid-modified nylon materials, polyacrylonitrile materials, basically dyeable, modified polyester materials, natural and regenerated cellulose materials, such as cotton and viscose, on which these compounds have good affinity and produce brilliant dyeings which have good fastness properties; they are distinguished in particular by their high tinctorial strength.

A preferred use of the methine-azo dyes of the formula (I) and (Ia) according to the invention lies in the dyeing of paper of all kinds, especially bleached, unsized and sized lignin-free paper. The compounds are very particularly suitable for dyeing unsized paper (tissues) owing to their very high standard affinity for this substrate.

The methine-azo compounds according to the invention exhaust very readily onto these substrates, leaving the waste waters colourless, which is a great technical and ecological advantage, in particular with regard to present-day waste water legislation. The high degree of exhaustion is also of advantage for good shade reproducibility. The degree of exhaustion is not affected by the hardness of the water. The dyeings on paper are distinguished in particular by their tinctorial strength, lightfastness and high affinity; they do not tend to bleed when dyed paper in the wet state is brought into contact with moist white paper. This property is particularly desirable for tissues where it is foreseeable that the dyed paper in the wet state (for example soaked with water, alcohol or surfactant solution) will come into contact with other surfaces, for example made of textiles or paper, which need to be protected against soiling.

The high affinity for paper and the high rate of dyeing of the methine-azo dyes according to the invention is of great advantage for the continuous dyeing of paper and thus makes possible a very wide use.

The methine-azo dyes are used not only as powder or granulate preparations but also in the form of concentrated solutions. Powder preparations are used in conventional manner together with standardising materials such as sodium sulfate, sodium phosphate, sodium chloride or sodium acetate in the presence of dedusting agents, or the methine-azo dyes are made commercially available in the form of spray-dried preparations. Concentrated solutions can be of the aqueous or organic-/aqueous kind, customary additives, such as organic acids, for example acetic acid, formic acid or lactic acid, amides such as formamide, dimethylformamide or urea, alcohols such as glycol, diglycol, diglycol ether, especially methyl or ethyl ether, being preferred.

An example of a favourable composition of such liquid preparations is:

100 parts of a methine-azo compound of the formula (I) or (Ia),
1–100 parts of an organic acid such as formic, acetic, lactic or citric acid,
100–800 parts of water and
0–500 parts of a solubiliser (for example glycols such as diethylene glycol, triethylene glycol or hexylene glycol, glycol ethers such as methyl cellosolve, methyl carbitol, butyl polyglycol, urea, formamide, dimethylformamide).

The following examples illustrate the invention and the preparation of the starting materials in more detail. Parts and percentages are by weight, unless otherwise stated.

(A) STARTING MATERIALS

EXAMPLE 1

(a) 85.8 g of N-methyl-4-methylpyridinium chloride and 103.1 g of 4-acetaminobenzaldehyde are suspended at room temperature in 720 ml of isopropanol. 10 ml of piperidine are added, and the mixture is refluxed for 2 hours. The mixture is then cooled down with stirring to room temperature and is finally also cooled in an ice bath. The yellowish brown crystal mass is then filtered off with suction and washed with a total of 150 ml of cold isopropanol. Drying leaves 155 g of a yellow crystalline powder.

(b) 57.7 g of the powder obtained in (a) are refluxed for 1 hour in a solution of 200 ml of water and 200 ml of 32% hydrochloric acid. The resulting yellow solution, after cooling down, is standardised with water to a weight of 493 g. This solution is used in this form for diazotisation, and contains the compound of the formula $$\left[ H_3C\text{—}N \overset{}{\underset{}{\bigcirc}} \text{—}CH=CH\text{—}\overset{}{\underset{}{\bigcirc}}\text{—}NH_2 \right]^{\oplus} Cl^{\ominus}$$

EXAMPLES 2–13

Example 1 is repeated, except that in Example 1(a) the N-methyl-4-methylpyridinium chloride is replaced by the quaternary salts listed in column II of Table 1. The products indicated in column III are obtained.

TABLE I

| I Example | II Quaternary salts | III Products R = —CH=CH—C₆H₄—NH₂ |
|---|---|---|
| 2 | [N-methyl-2-methylpyridinium]⁺ Cl⁻ | [N-methyl-2-R-pyridinium]⁺ Cl⁻ |
| 3 | [1-methyl-4-methylquinolinium (CH₃—N, CH₃)]⁺ CH₃SO₄⁻ | [1-methyl-4-R-quinolinium]⁺ CH₃SO₄⁻ |
| 4 | [1-methyl-2-methylquinolinium]⁺ CH₃SO₄⁻ | [1-methyl-2-R-quinolinium]⁺ CH₃SO₄⁻ (present as suspension) |

TABLE I-continued
| I Example | II Quaternary salts | III Products R = —CH=CH—C6H4—NH2 |
|---|---|---|
| 5 |  | 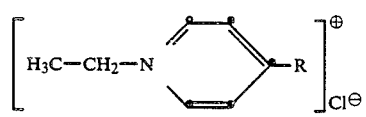 |
| 6 | 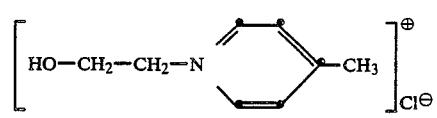 | 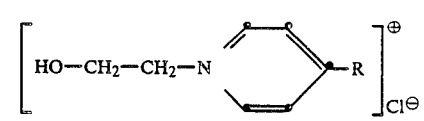 |
| 7 | 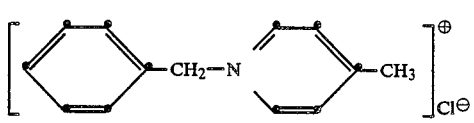 | 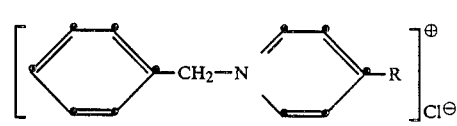 |
| 8 | 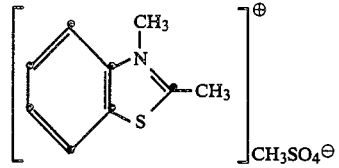 | 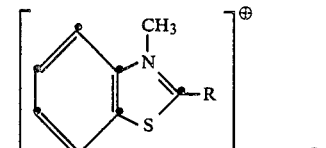 |
| 9 | 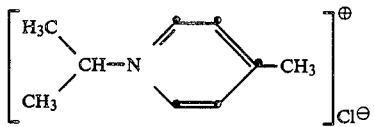 | 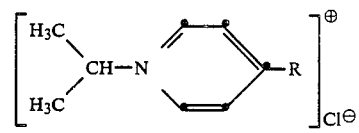 |
| 10 | 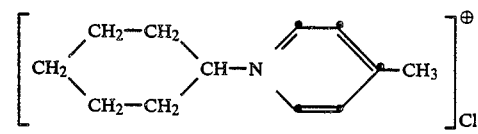 | 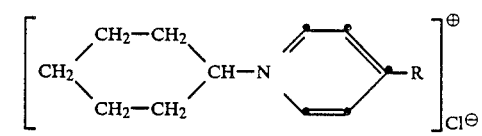 |
| 11 | 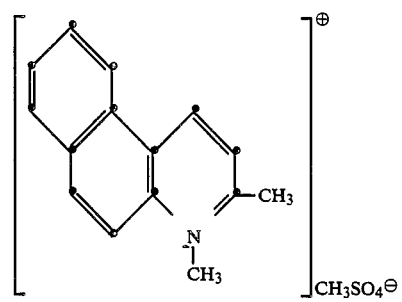 | 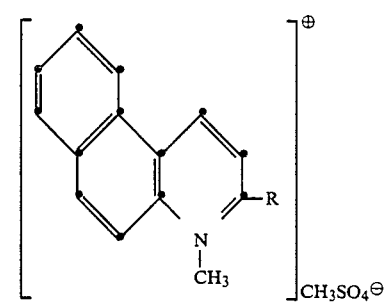 |
| 12 | 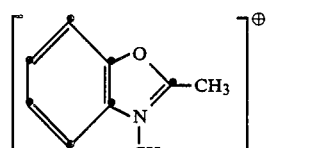 | 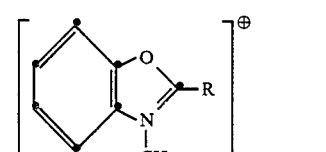 |

TABLE I-continued

| I Example | II Quaternary salts | III Products R = —CH=CH—C₆H₄—NH₂ |
|---|---|---|
| 13 | ![structure: 1,8-dimethylamino naphthalene with isopropenyl-CH₃, CH₃SO₄⁻] | ![same structure with R instead of CH₃, CH₃SO₄⁻] |
| 13a | ![1,2,3-trimethylbenzimidazolium, CH₃SO₄⁻] | ![1,3-dimethyl-2-R-benzimidazolium, CH₃SO₄⁻] |

EXAMPLE 14

24.5 g of the hydrochloride of chlorinated Fischer base (1,2,3,3-tetramethyl-5-chloroindolenine) and 17.3 g of 4-acetaminobenzaldehyde are refluxed for 1 hour in 750 ml of n-butanol. The deep red solution is concentrated in a rotary evaporator to a volume of about 200 ml, and after cooling down about 600 ml of ether are added to precipitate the product. The precipitated product is filtered off, washed with ether and dried. This gives 41.3 g of a red powder. The powder is refluxed for 1 hour in 400 ml of water and 400 ml of concentrated hydrochloric acid. Cooling down is followed by filtration, washing with water and drying.

This gives 22.15 g of the starting material of the formula

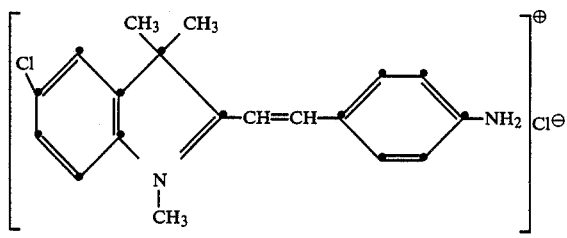

EXAMPLE 15

The method of Example 14 is used to convert the Fischer base into the compound of the formula

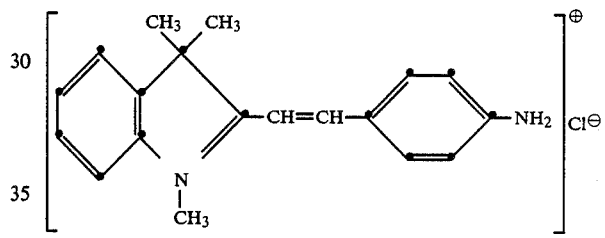

EXAMPLE 16

103.2 ml of the solution described in Example 1(b) are diazotised at 0°–5° C. with 10 ml of a 4N sodium nitrite solution. The diazo solution is subsequently stirred at 0°–5° C. for half an hour, and any small amount of excess nitrite present is corrected with sulfamic acid.

This diazo solution is added to a solution of 5.5 g of 3-amino-4-methoxytoluene in 50 ml of water and 8.4 ml of 32% hydrochloric acid. The resulting orange solution is brought with concentrated sodium carbonate solution to pH 4 in the course of about 15 minutes, and the reaction mixture is then stirred at room temperature for 2 hours. The brown suspension is then filtered off and washed twice with 5% sodium chloride solution. Drying leaves 16.95 g of a black powder which is to 96% (nitrite titre) the starting material of the formula

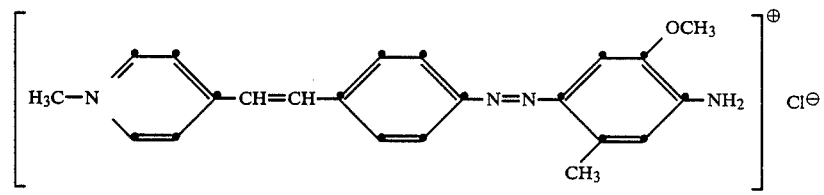

But this compound is also suitable for use as a dye, dyeing paper in a very deep reddish brown shade.

EXAMPLE 17

3.7 g of n-butylamine are gradually added dropwise with cooling to a mixture of 9.3 parts of epichlorohydrin and 0.7 ml of water in such a way that a temperature of 30°–35° C. is not exceeded. After the addition is complete, stirring is continued at 30° C. for 5 hours, the temperature is then raised to 95° C. and 19.6 g of γ-picoline are added dropwise in such a way that the temperature does not exceed 110°. The temperature of 110° C. is maintained for a further 4 hours, 40 ml of n-butanol are then added dropwise, and the mixture is stirred until cold. This gives 69 g of an orange solution of the product of the formula:

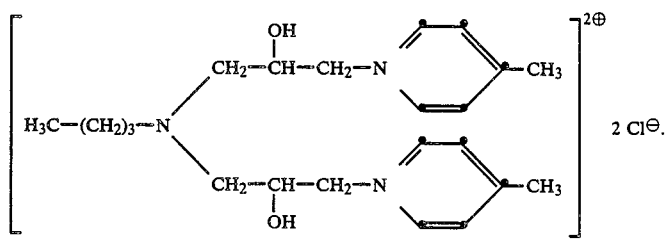

To 34.5 g of this butanolic solution are added a further 22 ml of n-butanol, 17.1 g of 4-acetaminobenzaldehyde and 2 ml of piperidine, and the mixture is heated to reflux and is maintained at that temperature for 1½ hours.

After stirring until cold, 140 ml of ether are gradually added dropwise, and the fine, brown suspension is then filtered, and the filter cake is washed thoroughly with ether. Drying leaves 18.8 g of a yellowish brown powder.

11.0 g of this powder are refluxed in 37.5 ml of 4N hydrochloric acid for 1 hour. After cooling down, the thick, orange-brown paste is adjusted with water to a weight of 97.5 g and briefly brought to the boil. On cooling down again, a thick suspension is present which contains 8.8% (nitrite titre) of the starting material of the formula

EXAMPLE 18

50 g of 1,4-bis-(chloromethyl)-benzene and 53.2 g of γ-picoline are refluxed in 383 ml of n-butanol for 6 hours. After stirring overnight until cold, the mixture is filtered and the filter residue is washed first with n-butanol and then with water. Drying leaves 84.2 g of a white powder of the formula

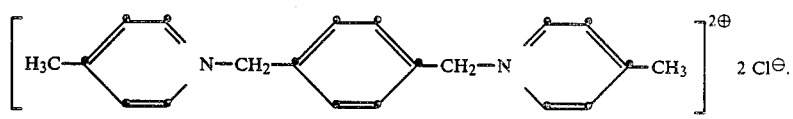

21.7 g of this powder are refluxed together with 20.0 g of 4-acetaminobenzaldehyde in 200 ml of isopropanol in the presence of 2 ml of piperidine for ½ hour. After cooling down, the mother liquor is decanted off, and the resinous residue is dissolved in 150 ml of hot water. 15 g of sodium chloride are added, and the mixture is stirred until cold. The gelatinised mass is comminuted the next day in a mixer in the presence of 150 g of ice and 50 ml of 25% sodium chloride solution and is then filtered. Drying leaves 35.5 g of a dark brown powder. This powder is refluxed in 218 ml of 4N hydrochloric acid for one hour. A yellow gel which is difficult to stir forms. After stirring until cold, the gel is stirred up with a toothed disc stirrer, about 2.5 ml of water being added neat the stirrer, and heated up to 60° C. A total of 130 g of crystalline sodium acetate is added to set pH 5, which is followed by filtering through a large preheated suction filter. After cooling down, the filtrate is clarified a total of 4 times through a fluted filter. The final result obtained is 1870 g of an orange-coloured solution which contains 8.8 g (nitrite titre) of the starting material of the formula

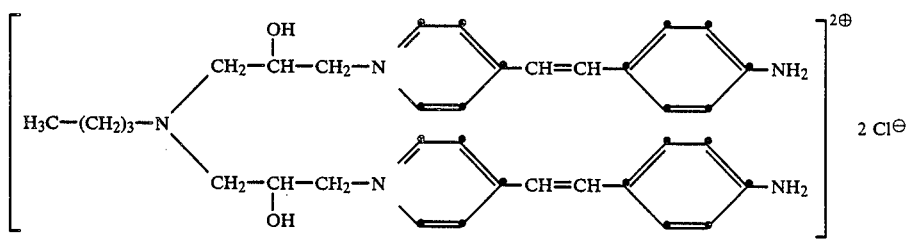

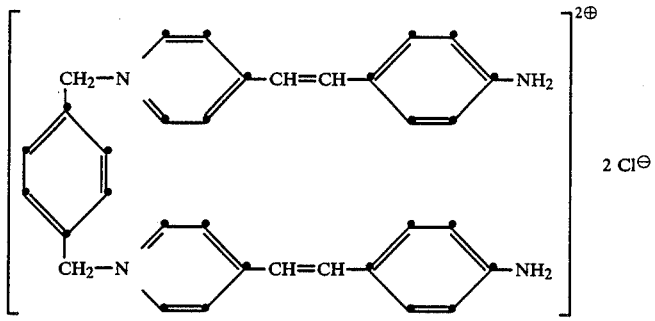

EXAMPLE 19

47.5 g of 4-picoline, 150 ml of isopropanol and 81.3 g of phenacyl chloride are heated to 150° C. in an autoclave for 3 hours. After cooling down, the brown suspension is filtered and the filter cake is thoroughly washed with ether. Drying leaves 113 g of a beige crystalline powder.

49.5 g of this powder are refluxed for 32 hours in 240 ml of isopropanol together with 34.3 g of 4-acetaminobenzaldehyde and 3.5 ml of piperidine. Cooling down in an ice bath is followed by filtration and washing of the residue with a little isopropanol. The residue is recrystallised from 300 ml of n-butanol; this gives 44.6 g of a reddish brown powder.

19.6 g of this powder are dissolved in 50 ml of hot glacial acetic acid, and 50 ml of water and 50 ml of 32% hydrochloric acid are then added. One hour under reflux is followed by stirring until cold, subsequent cooling in an ice bath, filtration and washing with a little cold water. Drying leaves 9.3 g of the compound of the formula

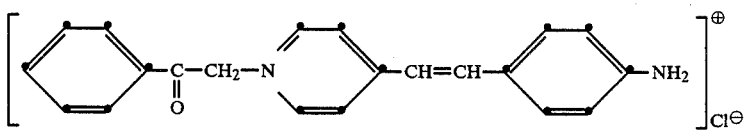

EXAMPLE 20

5.5 g of N-methyl-4-methylpyridinium chloride, 5 g of 2-aminobenzaldehyde and 0.65 ml of piperidine are refluxed in 75 ml of isopropanol for 5 hours. About 70 ml of solvent are then distilled off during a further hour. The cold, oily residue has gradually added to it, dropwise and with stirring, 400 ml of acetone, and the mixture is stirred overnight. The partly crystalline and partly oily residue is filtered off and redissolved in 20 ml of methanol, the solution is clarified by filtration, and the product is reprecipitated with 1 liter of acetone. The precipitated residue is filtered and dried. This gives 4.5 g of the compound of the formula

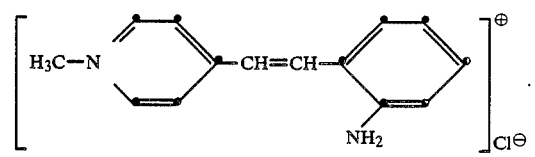

(B) END PRODUCTS

EXAMPLE 21

The compound of Example 1b is diazotised, and the diazo solution is poured onto 0.28 g of resorcinol in 15 ml of water. The pH is then set with 2N of sodium hyroxide solution to 7.0 and stirring is carried out at room temperature for 2 hours. The solids are filtered off and washed with a little 5% NaCl solution. This gives after drying 1.7 g of a dark brown dye mixture whose main component has the formula

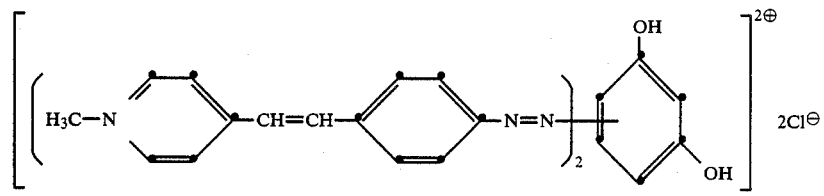

Melting point: >290° C. The dye is readily water-soluble and dyes paper in a reddish brown shade.

EXAMPLE 22

The compound of Example 1b is diazotised, and the diazo solution is poured onto a solution of 0.8 g of th compound of the formula

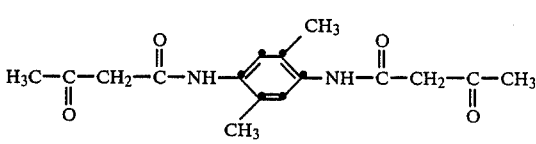

in 15 ml of dimethylformamide and 5 ml of water. The pH is set with concentrated sodium carbonate solution to 5, and the orange suspension is stirred at room temperature for 3 hours. Filtration, washing with 5% NaCl solution and drying gives 2.2 g of a reddish brown powder which has the formula

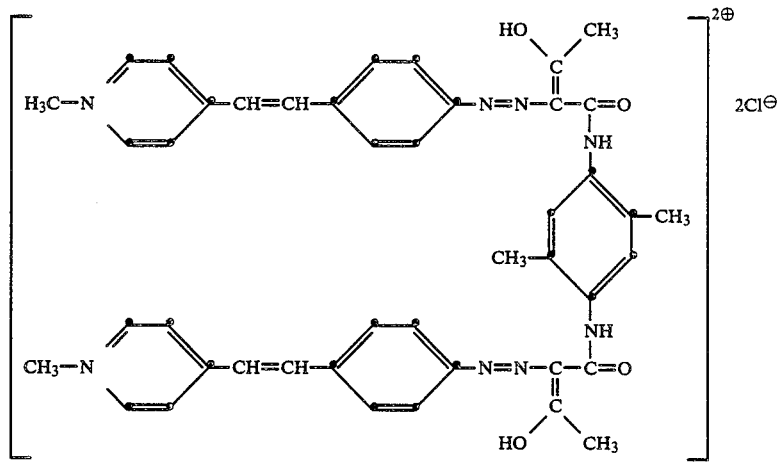

and dyes paper in a pure golden yellow shade.

EXAMPLES 23–28

The following dyes can be prepared analogously to Example 22 by using the appropriate bis-acetoacetyl coupling components:

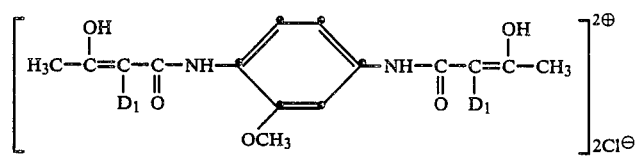

Example 23
orange

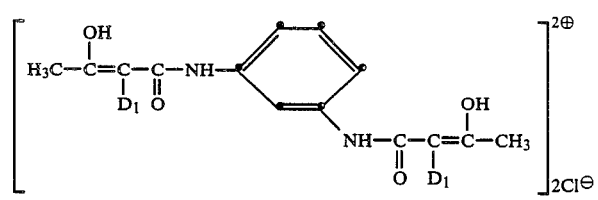

Example 24
yellow

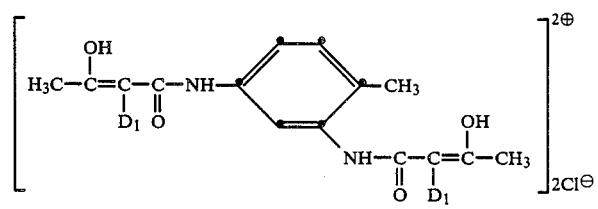

Example 25
yellow

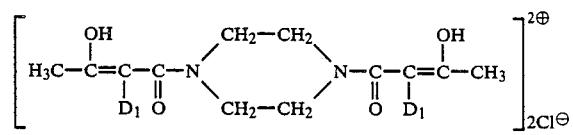

Example 26
yellow

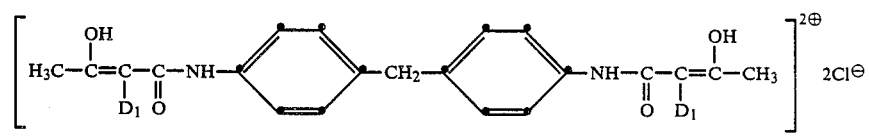

Example 27
yellow

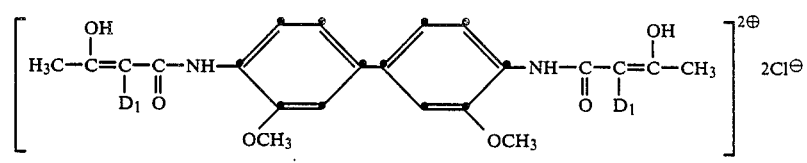

Example 28
orange

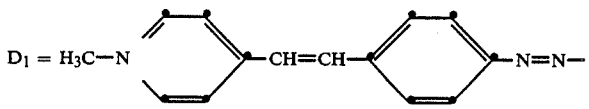

EXAMPLE 29

2 g of the starting material from Example 16 are suspended in 20 ml of water and 5 ml of 32% hydrochloric acid, and the suspension is cooled down to 0°–5° C. After addition of 4.8 ml of 1N sodium nitrite solution, the diazo compound goes into solution. The solution is then added to a solution of 0.6 g of 2,4,6-triaminopyrimidine in 15 ml of water, and the pH is set with concentrated sodium carbonate solution to 5. After stirring for 2 hours the solids are filtered off and washed with 5% NaCl solution. This gives 2.9 g of the dye of the formula

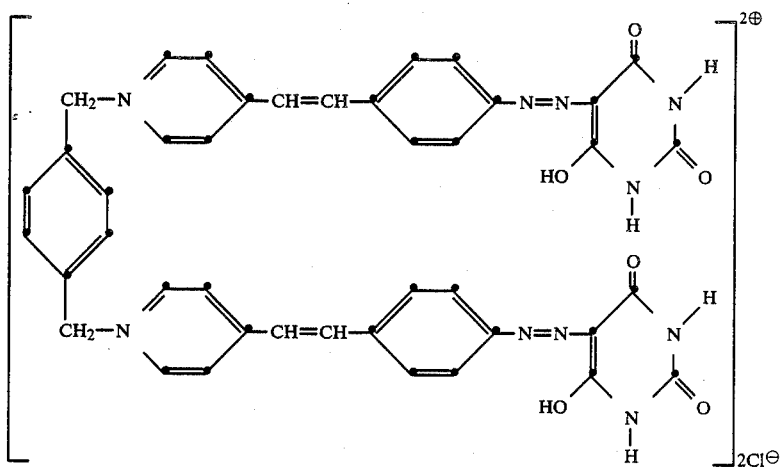

This dye dyes paper in a very deep violet-brown. Melting point: 260°–265° C.

EXAMPLE 30

187 g of the solution of Example 18 are diazotised by addition of 3.3 ml of 32% hydrochloric acid, cooling down to 0°–5° C. and addition of 3.1 ml of 1N sodium nitrite solution. After half an hour of subsequent stirring at 0°–5° C., this diazo solution is added to a solution of 0.4 g of barbituric acid in 15 ml of dimethylformamide and 15 ml of water. The pH is then set with concentrated sodium carbonate solution to 5. After half an hour of subsequent stirring, the solids are filtered off, washed with a little 5% sodium chloride solution and dried.

This gives 1.45 g of the dye of the formula

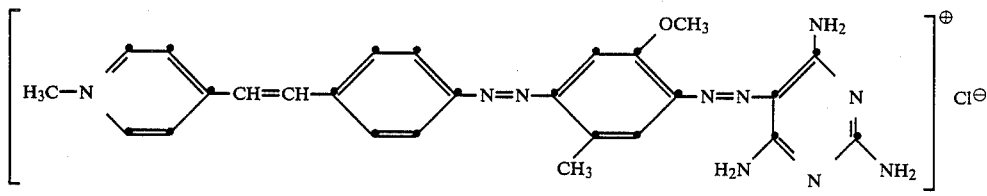

It dyes paper in a yellow shade.

EXAMPLE 31

16.3 g of the hydrochloric acid suspension of Example 17 are diazotised at 0°–5° C. with 4.4 ml of 1N sodium nitrite solution. The resulting suspension is then poured into a solution of 0.57 g of barbituric acid dissolved in 15 ml of dimethylformamide and 15 ml of water, and the pH is set with concentrated sodium carbonate solution to 5. The result is a brown suspension. This suspension is then stirred at room temperature for half an hour, and 50 ml of saturated NaCl solution are then added. The solids are then filtered off and washed with a little saturated NaCl solution.

Drying leaves 3.2 g of an ochre brown, salt-containing powder whose dye has the formula

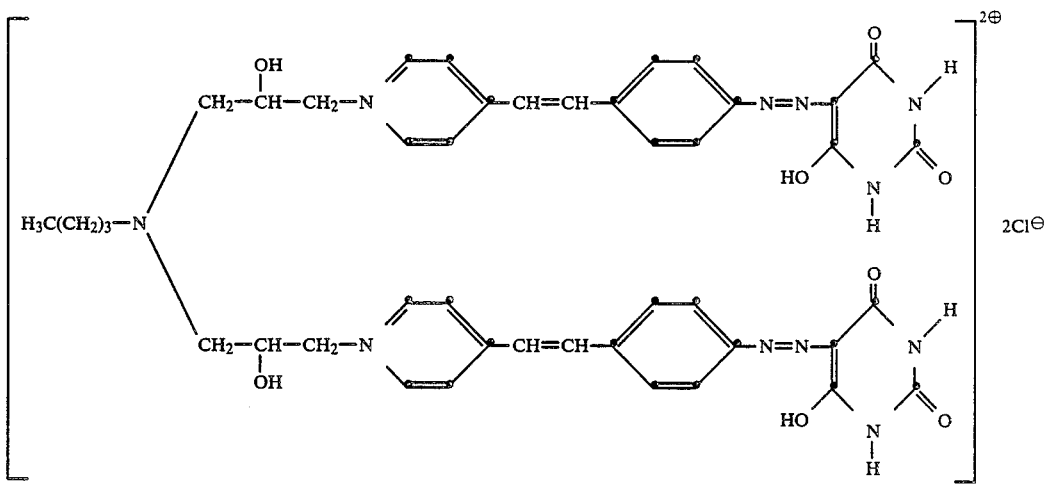

and dyes paper in a golden yellow shade.

EXAMPLE 32

On replacing in Example 21 the starting material from Example 1b by the starting material from Example 2, this gives the dye of the formula

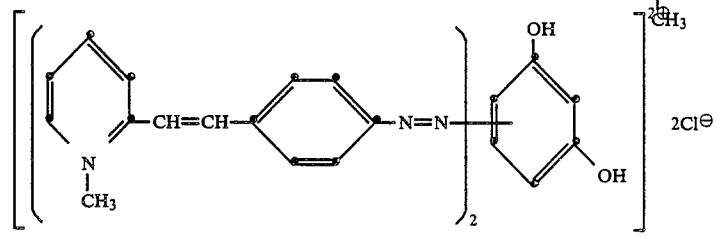

Shade on paper: reddish brown.

EXAMPLE 33

On replacing in Example 23 the starting material from Example 1b by that from Example 2, this gives the dye of the formula

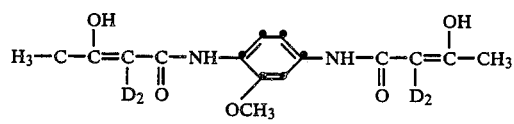

where $D_2=$

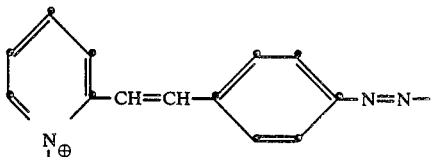

Shade on paper: yellow.

EXAMPLE 34

1.95 g of the starting material from Example 14 are suspended in 20 ml of water and 1.5 ml of concentrated hydrochloric acid and are diazotised at 0°–5° C. with 5 ml of 1N sodium nitrite solution. After half an hour of stirring at 0°–5° C. the diazo solution is poured into a solution of 1.75 g of the compound of the formula

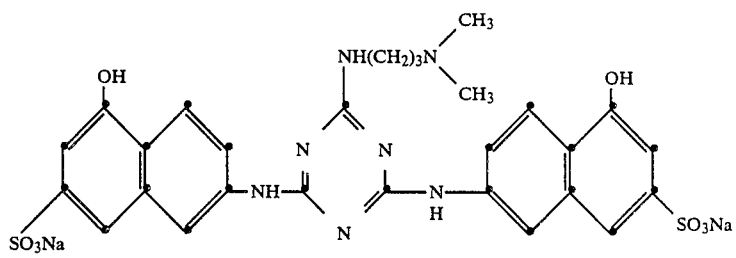

dissolved in 20.5 ml of water and the pH is set with concentrated sodium carbonate solution to 6. After 1½ hours the coupling has ended. The solids are filtered off and are washed with a little 5% sodium chloride solution. Drying leaves 3.6 g of the dye of the formula

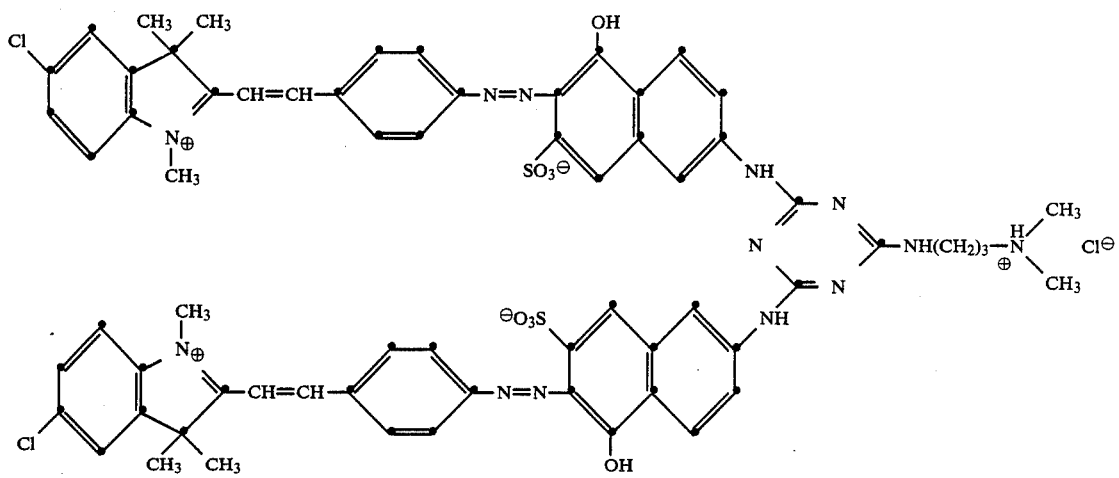

It dyes paper in a violet-blue shade.

EXAMPLE 35

0.2 g of the dye prepared in Example 22 is pasted up with 2 g of 40% aqueous acetic acid and then dissolved by addition of 4000 ml of hot water. 1 g of sodium acetate and 2 g of an adduct, quaternised with dimethyl sulfate, of 15 to 20 equivalents of ethylene oxide on N-octadecyldiethylenetriamine are added, and 100 g of polyacrylonitrile fabric are entered at 60° C. The bath is heated to 100° C. in the course of 30 minutes, and dyeing is then carried out at the boil for 90 minutes. The liquor is then allowed to cool down to 60° C. in the course of 30 minutes. The material thus dyed is then removed and subsequently rinsed with lukewarm and cold water. The polyacrylonitrile fabric has been dyed yellow. The dyeing has a good light fastness.

EXAMPLE 36

A polyacrylonitrile copolymer consisting of 93% acrylonitrile and 7% vinyl acetate is dissolved in 15% strength dimethylacetamide. The spinning liquid is extruded into a spin bath which consists of 40% dimethylacetamide and 60% water. The resulting tow is subsequently stretched by known methods and rinsed with hot and cold water to remove dimethylacetamide.

This wet tow is dyed by dipping into a bath at 42° C. of the following composition:
4.5 g/l dye of Example 30
pH 4.5 with acetic acid.

The content time between tow and dyeing (liquor is 3–5 seconds. The excess dyeing liquor is subsequently squeezed off and the tow is fed into the dryer. The result is a yellow tow having good fastness properties.

EXAMPLE 37

A print paste is prepared consisting of:
10 g of the dye obtained as described in Example 27,
30 g of thiodiglycol,
20 ml of 80% acetic acid,
350 ml of boiling water,
500 g of carob bean flour thickening,
30 g of tartaric acid,
15 g of di-(β-cyanoethyl)-formamide and
30 g of a naphthalenesulfonic acid/formaldehyde condensation product.

A polyacrylonitrile fabric printed with this print paste is then fixed at 101° to 103° C. in an HT festoon ager in the course of 20 to 30 minutes and is finished in conventional manner. The result obtained is a yellow print.

EXAMPLE 38

A paper web of bleached beech sulfite (22° SR) is prepared on a continuous laboratory paper machine. An aqueous solution of the dye of Example 21 is continuously metered under conditions of high turbulence into the thin stuff 10 seconds ahead of the headbox (0.2% dye, liquor ratio 400:1, water hardness: 10° German hardness, pH 6, temperature 20° C.).

The result is a reddish brown shade on the paper web. The waste water is completely colourless.

EXAMPLE 39

50 g of chemically bleached beech sulfite are mixed with 50 g of bleached spruce sulfite (freeness: 22° SR) and 0.2 g of the dye of Example 31 in water (pH 6, water hardness 10° German hardness, temperature 20° C., liquor ratio 40:1). After stirring for 15 minutes, sheets of paper are prepared on a Frank sheet-former.

The paper has been dyed a golden yellow shade. The waste water is completely colourless. The degree of exhaustion is practically 100%. The wet fastness properties are excellent.

If in Examples 35 to 39 the remaining compounds of Examples 21–34 are used as dyes, this likewise produces good and fast dyeings on the respective substrates.

I claim:

1. A methine-azo compound of the formulae

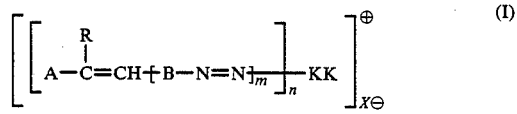

or

-continued

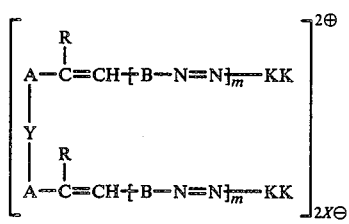

in which

A is one of the following rings

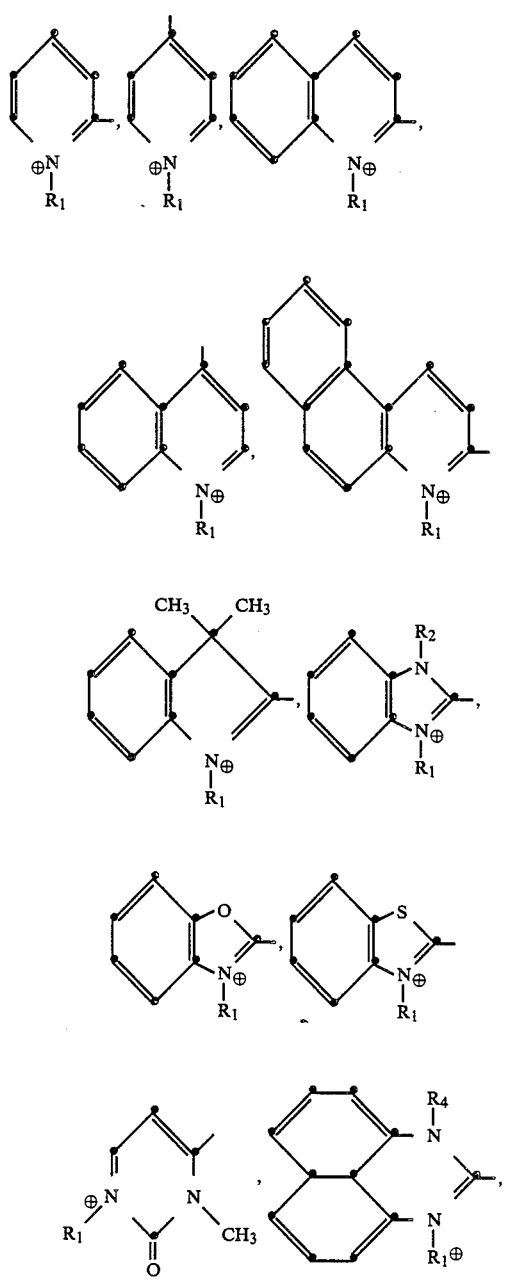

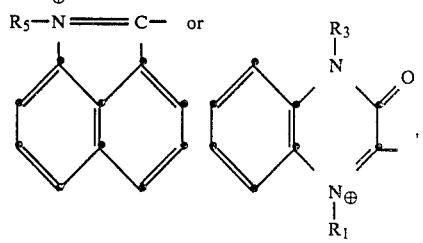

said rings, in addition to the substituents $R_1$–$R_5$, being unsubstituted or substituted by nitro, halogen, cyano, $C_1$–$C_4$-alkyl, $C_1$–$C_4$-alkoxy, acetylamino or dimethylamino, and in which $R_1$, $R_2$, $R_3$ and $R_4$, independently of one another, are $C_1$–$C_8$-alkyl, $C_2$–$C_8$-alkenyl, or $C_3$–$C_6$-cycloalkyl, or one of these groups in which the alkyl, alkenyl or cycloalkyl chain is interrupted by oxygen or nitrogen atoms, whereby these groups are unsubstituted or are substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy, and $R_5$ is phenyl or is as defined for $R_1$, R is hydrogen, cyano or $C_2$–$C_3$-alkylene which is bonded to an N atom of ring A to form a 5- or 6-membered ring, B is unsubstituted phenylene or naphthylene, or phenylene or naphthylene which is substituted by $C_1$–$C_4$-alkyl, $C_1$–$C_4$-alkoxy, halogen, sulfo or acetylamino, m and n independently of each other are the numbers 1 or 2, in the formula (I) at least one of the two symbols m and n being the number 2 and where in the case m=2 the two B's are identical or different, KK is the radical of a coupling component selected from the group consisting of a phenol, dihydroxybenzene, aniline, diphenylamine, naphthol, naphtholsulfonic acid, dihydroxynaphthalene, naphthylamine, hydroxynaphthylamine, 2,6-diaminopyridine, dihydroxypyridine, pyridone, quinoline, benzimidazole, benzoquinoline, pyrimidine, pyrimidone, indole, pyrazole or of a derivative of acetoacetic acid, malonic acid or cyanoacetic acid, $X^\ominus$ is an anion and Y is $C_1$–$C_8$-alkylene, $C_2$–$C_8$-alkenylene, cyclohexylene, each of which is unsubstituted or substituted by hydroxyl, halogen or $C_1$–$C_4$-alkoxy, $C_1$–$C_4$-alkylenephenylene-$C_1$–$C_4$-alkylene in which phenylene is unsubstituted or substituted by hydroxyl, methyl, methoxy or halogen, or a group of the formula

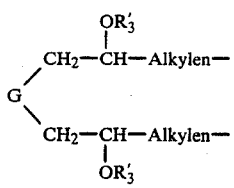

in which
R′₃ is hydrogen, C₁–C₄-alkyl, aralkyl or acetyl and
G is

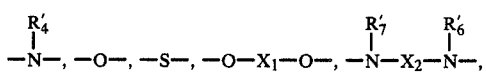

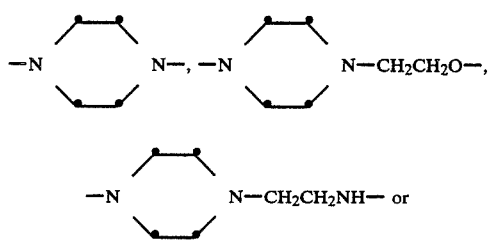

where
R′₄ is hydrogen, C₁–C₂₁-alkyl, cycloalkyl or aralkyl, or one of these groups in which the C-chain is interrupted by oxygen or sulfur,
R′₅ and R′₇, independently of each other, are alkyl, phenylalkyl or phenyl,
X₁ is alkylene or diarylenealkylene or one of these groups in which the C-chain is interrupted by —COO—,

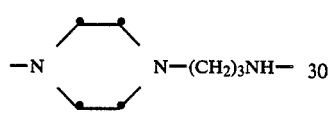

oxygen or sulfur and
X₂ is alkylene or diarylenealkylene or one of these groups in which the C-chain is interrupted by

or oxygen.

2. A methine-azo compound according to claim 1, in which R is hydrogen.

3. A methine-azo compound according to claim 1, in which B is phenylene.

4. A methine-azo compound according to claim 1, in which B is 1,4-phenylene.

5. A methine-azo compound according to claim 1, in which m is 1 and n is 2.

6. A methine-azo compound according to claim 1, in which Y joins the two rings A via the respective quaternised N atoms.

7. A methine-compound according to claim 1, in which Y is C₁–C₄-alkylene,

or a group of the formula

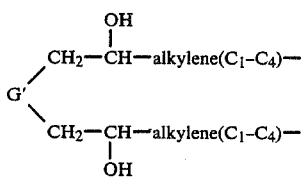

in which G′ is

where R′₇=C₁–C₈-alkyl.

8. A methine-azo compound according to claim 1, in which A is one of the following rings

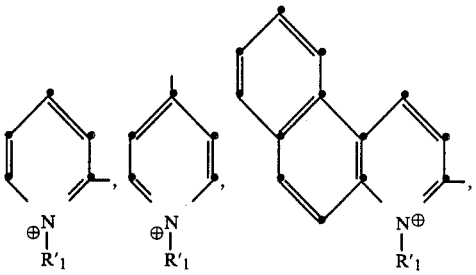

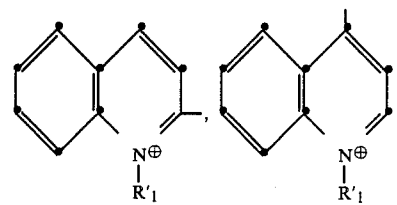

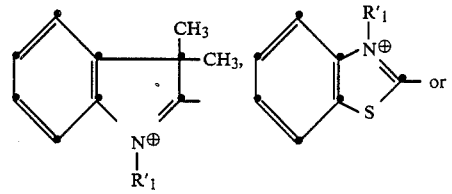

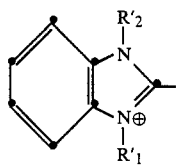

in which R′₁ and R′₂, independently of each other, are C₁–C₄-alkyl, benzyl, cyclohexyl, hydroxyalkyl or C₃–C₄-alkenyl and the stated rings are otherwise unsubstituted or substituted by halogen, cyano, C₁-C₄-alkyl, C₁-C₄-hydroxyalkyl or C₁-C₄-alkoxy.

9. A methine-azo compound according to claim 8, in which A is a pyridinium or 3,3-dimethylindolenium ring in which R'₁ is methyl.

10. A methine-azo compound according to claim 1, in which KK is the radical of a coupling component selected from the group consisting of acetoacetylamide or acetoacetyl ester, pyrimidine, pyrimidone, 8-hydroxyquinoline, benzimidazole, naphthol, pyridone, naphtholsulfonic acid, aniline or dihydroxybenzene.

11. A methine-azo compound according to claim 10, in which KK is the radical of a coupling component of the following formulae:

Z—CH₂—CO—CH₂—CO—R₄₄, CH₃—CO—CH₂—CO—D—CO—CH₂—CO—CH₃,

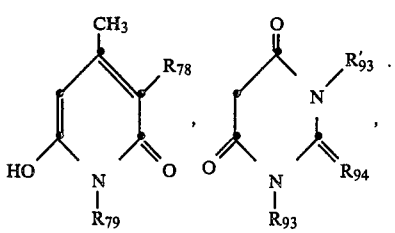

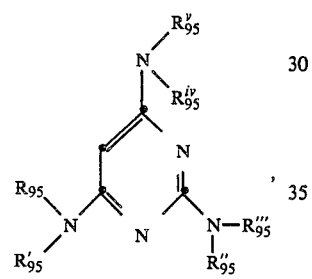

in which Z is hydrogen, halogen or a group of the formula

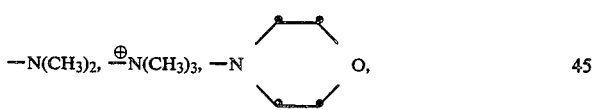

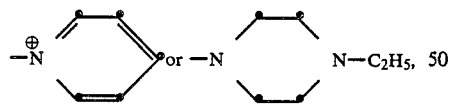

in which R₄₄ is alkoxy having 1–8 carbon atoms or cycloalkoxy, benzyloxy or phenoxy which are unsubstituted or substituted by C₁-C₄-alkyl, C₁-C₄-alkoxy, halogen, acetylamino, carboxamido, sulfonamido, dialkylamino, C₁-C₄-alkylcarbonyl, C₁-C₄-alkoxycarbonyl, OH or phenyl, or R₄₄ is a radical of the formula

in which R₄₅ is C₁-C₄-alkyl or hydrogen and R₄₆ is hydrogen, C₁-C₈-alkyl or cycloalkyl substituted by halogen, OH, alkoxy or amino or unsubstituted C₁-C₈-alkyl or cycloalkyl or benzyl or a phenyl radical of the formula

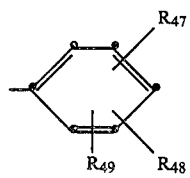

in which R₄₇ is hydrogen, C₁-C₄-alkyl, C₁-C₄-alkoxy, halogen, cyano, nitro, OH, dialkylamino, phenylamino,

phenyl, acetylamino, carboxamido, sulfonamido, C₁-C₄-alkylcarbonyl, C₁-C₄-alkoxycarbonyl, C₁-C₄-alkylsulfonyl, a radical of the formula —(CH₂)ᵥᵥ—K⊕Anᶱ, where K⊕ is an aliphatic or aromatic ammonium group, of the formula

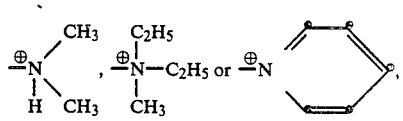

and w is 1 or 2, a radical of the formula

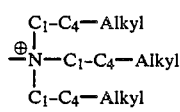

R₄₈, independently of R₄₇, is hydrogen, C₁-C₄-alkyl, C₁-C₄-alkoxy or halogen;

R₄₉, independently of R₄₇ and R₄₈, is hydrogen, halogen or C₁-C₄-alkyl, or R₄₆ is, together with R₄₅ a 5- or 6-membered saturated or unsaturated ring, of the formula

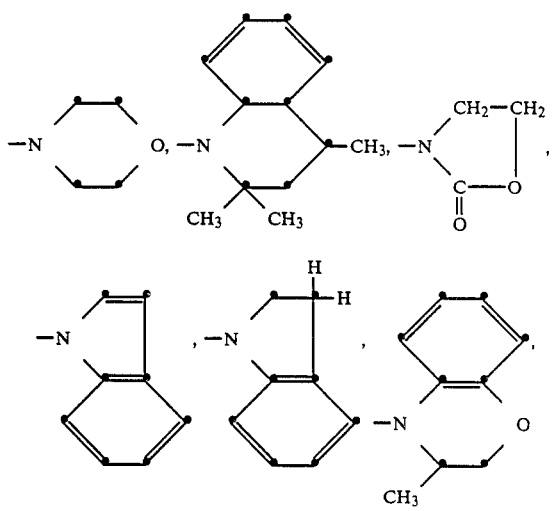

-continued

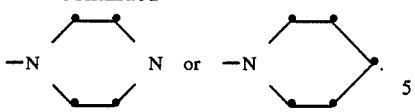

or R₄₄ is a heterocyclic amine, of the formula

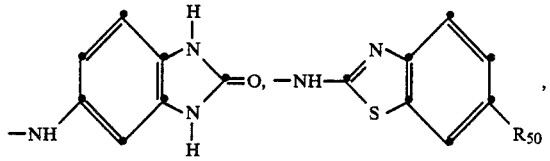

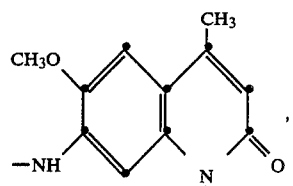

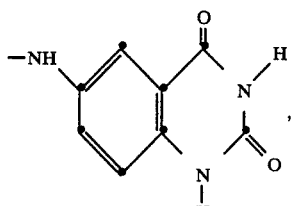

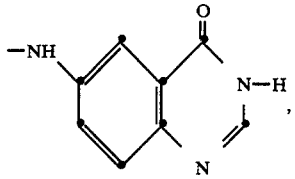

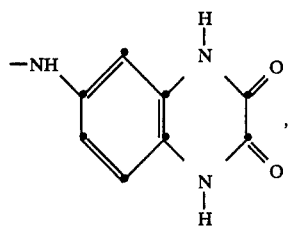

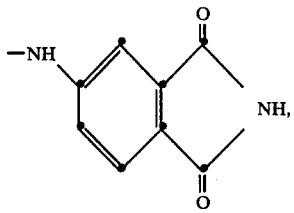

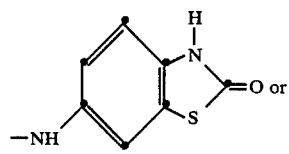

where $R_{50}$ is methyl, ethyl, methoxy, ethoxy or hydrogen or acetylamino, or $R_{44}$ is a radical of the formula

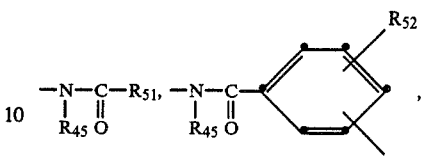

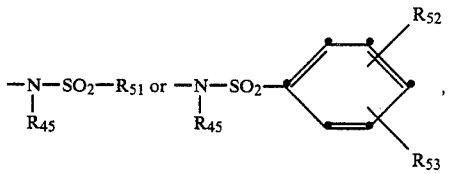

where $R_{45}$ is as defined above and $R_{51}$ is alkyl having 1–8 carbon atoms, cycloalkyl, amino, alkylamino, dialkylamino, phenylamino, alkoxy or phenoxy and $R_{52}$ and $R_{53}$, independently of each other, are hydrogen, $C_1$–$C_4$-alkyl, $C_1$–$C_4$-alkoxy, halogen or dialkylamino, D is the radical of a dihydric aliphatic alcohol, of an aliphatic amino alcohol, of an aliphatic or aromatic diamine, of an aminophenol, of an aminonaphthol, of a dihydroxybenzene, of a dihydroxynaphthalene, of a hydroxybenzamide, of an aminobenzamide, or of an aminobenzenesulfonamide, whereby all these radicals are unsubstituted or substituted by $C_1$–$C_4$-alkyl, $C_1$–$C_4$-alkoxy or halogen;

$R_{78}$ is CN, CONH or $SO_2NH_2$, $R_{79}$ is hydrogen or substituted or unsubstituted $C_1$–$C_8$-alkyl, $R_{93}$ and $R'_{93}$, independently of each other, are hydrogen or $C_1$–$C_4$-alkyl, $R_{94}$ is O or N—CN and $R'_{95}$, $R''_{95}$, $R'''_{95}$, $R^v_{95}$ and $R_{95}$ independently of one another, are each hydrogen, $C_1$–$C_4$-alkyl, $C_2$–$C_4$-alkenyl, cyclopentyl, cyclohexyl, phenyl, benyl or phenethyl.

12. A methine-azo compound according to claim 11, in which KK is the radical of one of the following coupling components:

$CH_3$—CO—$CH_2$—CO—D'—CO—$CH_2$—CO—$CH_3$,

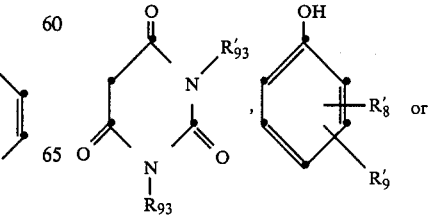

-continued

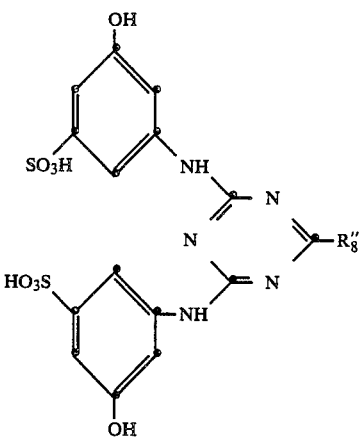

in which D' is 1,4-piperazinyl or

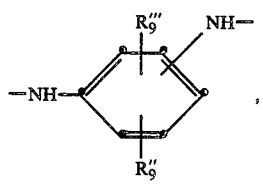

-continued

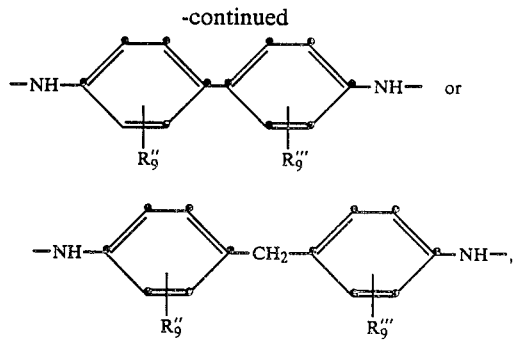

R''$_9$ and R'''$_9$, independently of each other, each are hydrogen, $C_1$–$C_4$-alkyl, $C_1$–$C_4$-alkoxy or halogen, R'$_8$ and R'$_9$, independently of each other, are hydrogen, $C_1$–$C_4$-alkyl, OH, $C_1$–$C_4$-alkoxy or halogen, R''$_8$ is —NH(CH$_2$)$_x$—N(Alk)$_2$, x is a number from 2 to 4, Alk is $C_1$–$C_4$-alkyl, R$_{93}$ and R'$_{93}$, independently of each other, are hydrogen or $C_1$–$C_4$-alkyl.

13. A methine-azo compound according to claim 11, in which A is one of the rings

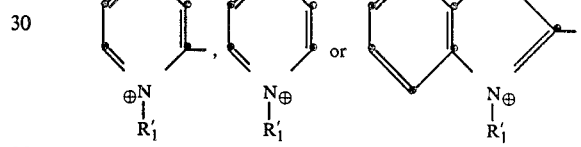

in which the R'$_1$'s independently of one another are $C_1$–$C_4$-alkyl.

* * * * *